US012632361B1

(12) United States Patent (10) Patent No.: US 12,632,361 B1

Volpe (45) Date of Patent: May 19, 2026

(54) MULTI-LEVEL ACTION LOOKUP TABLE FOR DYNAMIC THROTTLING ADJUSTMENTS

(71) Applicant: Amazon Technologies, Inc., Seattle, WA (US)

(72) Inventor: Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 998 days.

(21) Appl. No.: 17/730,091

(22) Filed: Apr. 26, 2022

(51) Int. Cl.
*G06F 11/34* (2006.01)
*G06F 15/80* (2006.01)
*G06N 20/00* (2019.01)

(52) U.S. Cl.
CPC ...... *G06F 11/3442* (2013.01); *G06F 11/3466* (2013.01); *G06F 15/8046* (2013.01); *G06N 20/00* (2019.01)

(58) Field of Classification Search
CPC ............. G06F 11/3442; G06F 11/3466; G06F 15/8046; G06N 20/00
See application file for complete search history.

(56) References Cited

U.S. PATENT DOCUMENTS

| | | | |
|---|---|---|---|
| 10,555,145 | B1 | 2/2020 | Siddiqui |
| 11,442,890 | B1 | 9/2022 | Volpe |
| 11,520,731 | B1 | 12/2022 | Diamant |
| 11,766,951 | B2 | 9/2023 | Healy |
| 11,899,551 | B1 | 2/2024 | Volpe |
| 2016/0012010 | A1 | 1/2016 | Ganapathy |
| 2016/0041948 | A1 | 2/2016 | Vichare |
| 2016/0098313 | A1 | 4/2016 | Moyer |
| 2017/0235622 | A1 | 8/2017 | Boyapalle |
| 2019/0393965 | A1 | 12/2019 | Zhang |
| 2021/0019652 | A1 | 1/2021 | Gadelrab |
| 2021/0034282 | A1 | 2/2021 | Ahn |
| 2021/0081806 | A1 | 3/2021 | Chai |
| 2021/0096873 | A1* | 4/2021 | Moyer .................... G06F 9/384 |
| 2021/0286419 | A1 | 9/2021 | Gan |
| 2021/0341988 | A1 | 11/2021 | Chung |
| 2022/0138101 | A1 | 5/2022 | Appu |
| 2022/0413582 | A1 | 12/2022 | Naveh |
| 2023/0265807 | A1 | 8/2023 | Moine |

OTHER PUBLICATIONS

Guo, et al., "A Survey of FPGA-Based Neural Network Inference Accelerator," ACM Transactions on Reconfigurable Technology and Systems, vol. 12, Issue 1, Article No. 2, pp. 1-26, https://doi.org/10.1145/3289185, 2018.

(Continued)

*Primary Examiner* — Jorge A Chu Joy-Davila

(74) *Attorney, Agent, or Firm* — S. Scott Foster; Kowert, Hood, Munyon, Rankin & Goetzel, P.C.

(57) ABSTRACT

A software-based activity monitor may dynamically change throttling criteria applied by a hardware-based activity monitor to a processing engine without interruption. The hardware-based activity monitory may use a multi-level activity table to determine throttling criteria to apply. The software-based activity monitor can rewrite a remapping sub-table of the multi-level action table in a single write in order to change which throttling criteria are determined as part of accessing the multi-level action table.

20 Claims, 23 Drawing Sheets

(56) References Cited

OTHER PUBLICATIONS

U.S. Appl. No. 17/730,089, filed Apr. 26, 2022, Thomas A. Volpe.
U.S. Appl. No. 17/730,090, filed Apr. 26, 2022, Thomas A. Volpe.
R. K. Unni, et al., "FPGA Implementation of an Improved Watchdog timer for Safety-Critical Applications," 2018 31st International converence on VLSI Design and 2018 17th International Conference on Embedded Systems (VLSID), Pune India, 2018, pp. 55-60.

* cited by examiner

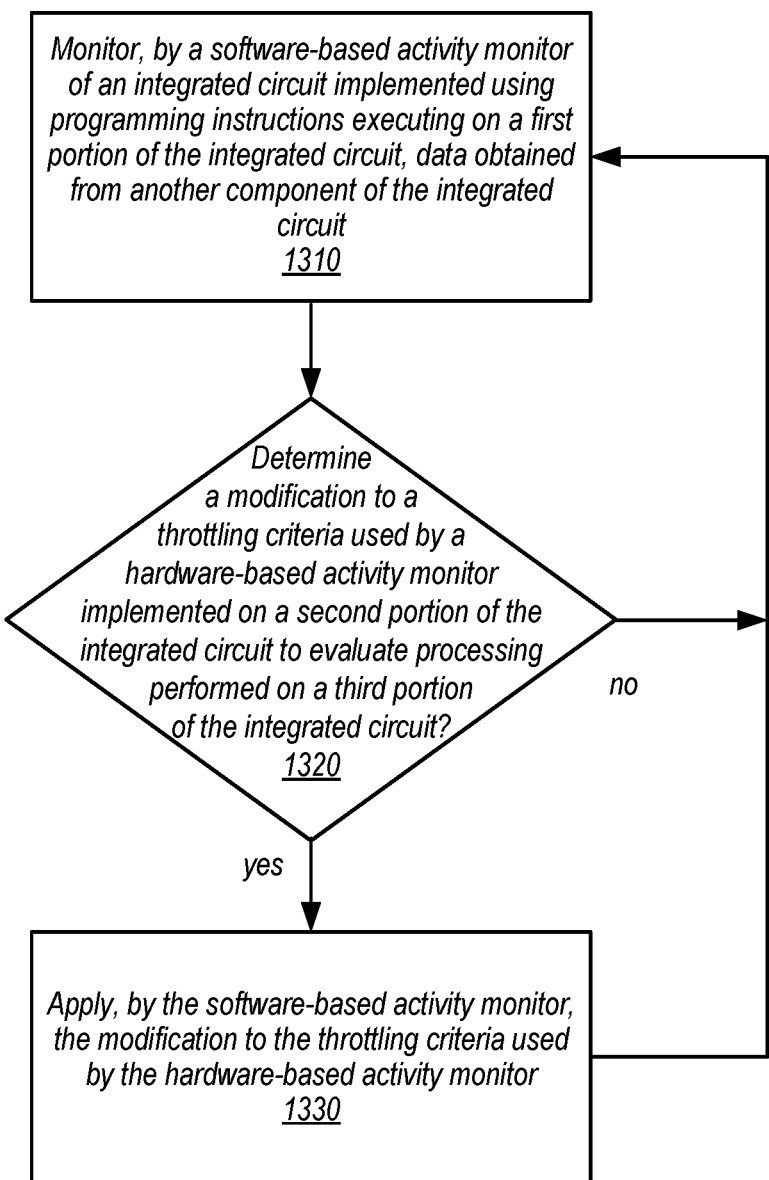

Monitor, by a software-based activity monitor of an integrated circuit implemented using programming instructions executing on a first portion of the integrated circuit, data obtained from another component of the integrated circuit
1310

Determine a modification to a throttling criteria used by a hardware-based activity monitor implemented on a second portion of the integrated circuit to evaluate processing performed on a third portion of the integrated circuit?
1320 no yes

Apply, by the software-based activity monitor, the modification to the throttling criteria used by the hardware-based activity monitor
1330

FIG. 13

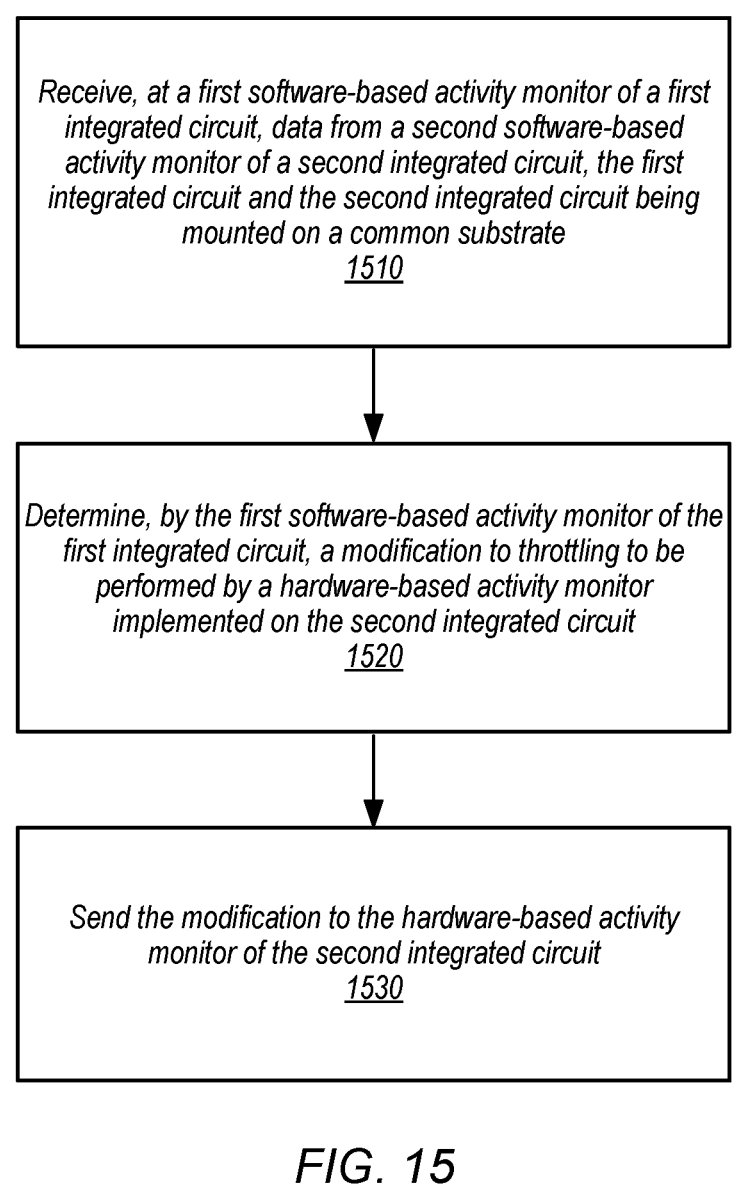

Receive, at a first software-based activity monitor of a first integrated circuit, data from a second software-based activity monitor of a second integrated circuit, the first integrated circuit and the second integrated circuit being mounted on a common substrate
1510

Determine, by the first software-based activity monitor of the first integrated circuit, a modification to throttling to be performed by a hardware-based activity monitor implemented on the second integrated circuit
1520

Send the modification to the hardware-based activity monitor of the second integrated circuit
1530

FIG. 15

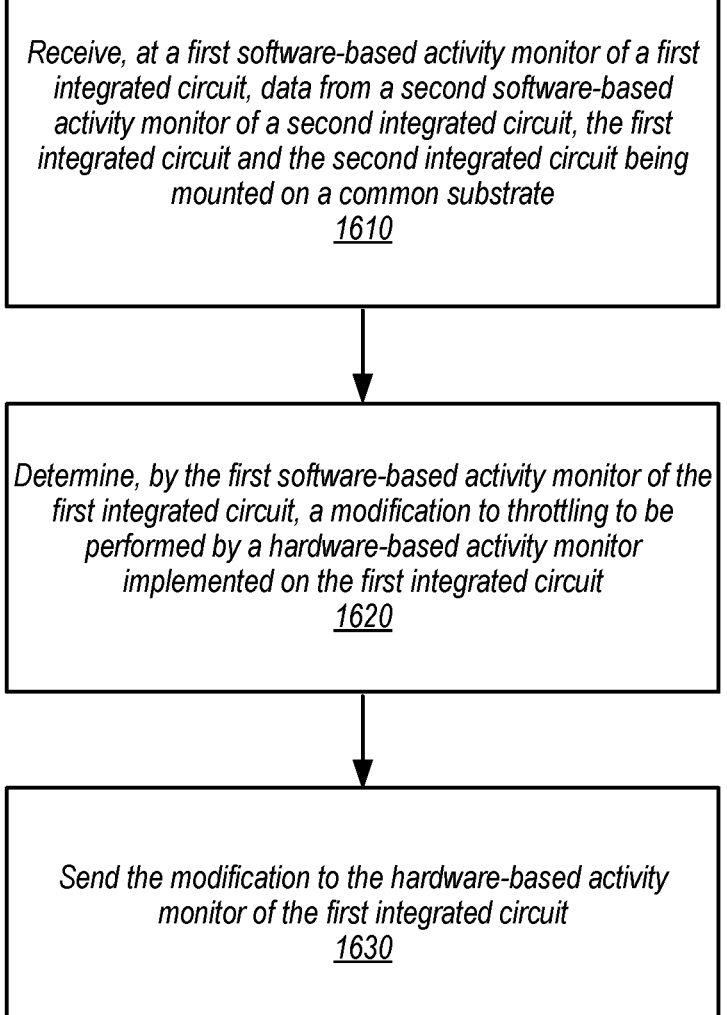

*Receive, at a first software-based activity monitor of a first integrated circuit, data from a second software-based activity monitor of a second integrated circuit, the first integrated circuit and the second integrated circuit being mounted on a common substrate*
*1610*

*Determine, by the first software-based activity monitor of the first integrated circuit, a modification to throttling to be performed by a hardware-based activity monitor implemented on the first integrated circuit*
*1620*

*Send the modification to the hardware-based activity monitor of the first integrated circuit*
*1630*

*FIG. 16*

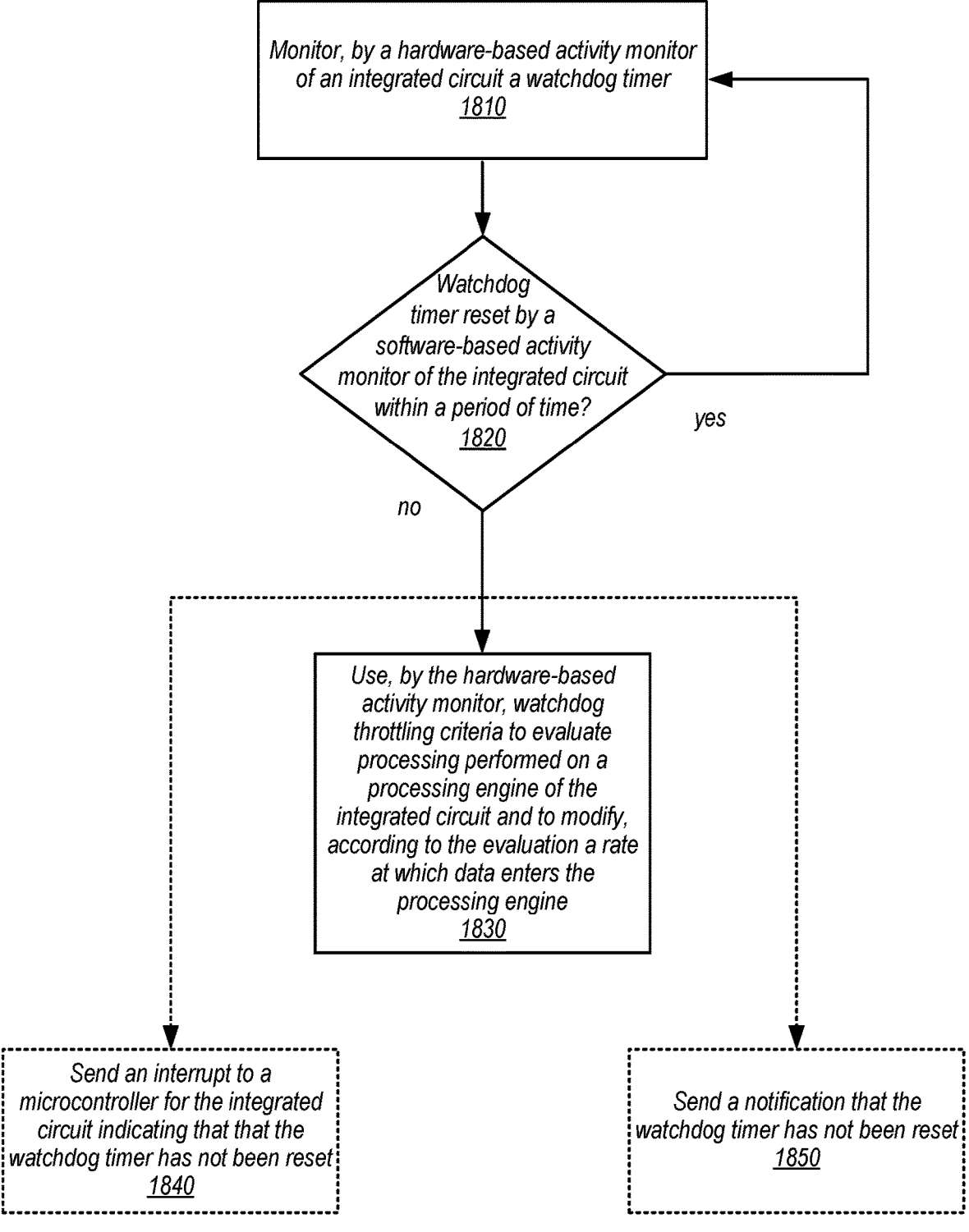

*Monitor, by a hardware-based activity monitor of an integrated circuit a watchdog timer*
*1810*

*Watchdog timer reset by a software-based activity monitor of the integrated circuit within a period of time?*
*1820*

*yes*

*no*

*Use, by the hardware-based activity monitor, watchdog throttling criteria to evaluate processing performed on a processing engine of the integrated circuit and to modify, according to the evaluation a rate at which data enters the processing engine*
*1830*

*Send an interrupt to a microcontroller for the integrated circuit indicating that that the watchdog timer has not been reset*
*1840*

*Send a notification that the watchdog timer has not been reset*
*1850*

*FIG. 18*

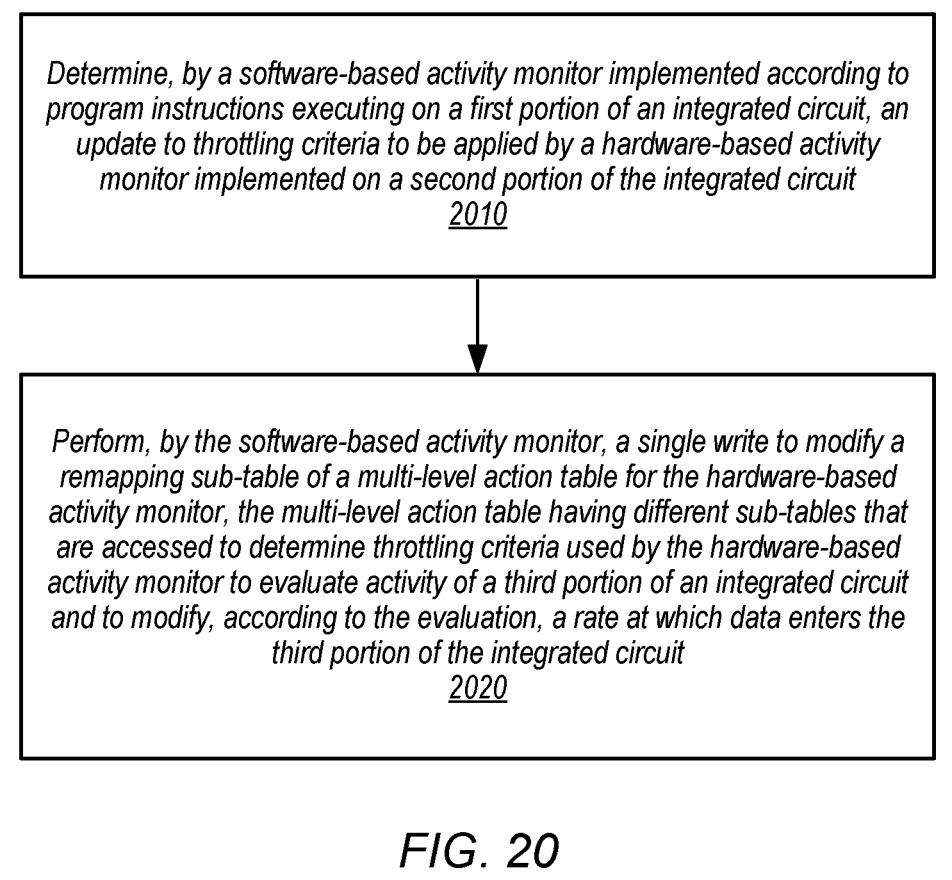

Determine, by a software-based activity monitor implemented according to program instructions executing on a first portion of an integrated circuit, an update to throttling criteria to be applied by a hardware-based activity monitor implemented on a second portion of the integrated circuit
2010

Perform, by the software-based activity monitor, a single write to modify a remapping sub-table of a multi-level action table for the hardware-based activity monitor, the multi-level action table having different sub-tables that are accessed to determine throttling criteria used by the hardware-based activity monitor to evaluate activity of a third portion of an integrated circuit and to modify, according to the evaluation, a rate at which data enters the third portion of the integrated circuit
2020

FIG. 20

MULTI-LEVEL ACTION LOOKUP TABLE FOR DYNAMIC THROTTLING ADJUSTMENTS

BACKGROUND

Integrated circuits provide a hardware solution for various processing tasks that is performant and efficient. Increasing numbers of processing tasks are offloaded from a host central processing unit (CPU) to integrated circuits to take advantage of these benefits. For example, the increasing popularity of including machine learning in various different applications, such as computer vision, speech recognition, machine translation, among others, has increased the use of integrated circuits that implement systolic arrays to perform processing tasks for machine learning. Systolic arrays offer a highly performant solution to execute large numbers of operations, such as multiply and accumulate, in parallel, increasing the speed of applications like machine learning that utilize such large numbers of operations.

BRIEF DESCRIPTION OF THE DRAWINGS

FIG. 13 is a high-level flowchart illustrating various methods and techniques to implement on-chip software-based activity monitor to configure throttling at a hardware-based activity monitor, according to some embodiments.

FIG. 15 is a high-level flowchart illustrating various methods and techniques to implement cross-chip throttling management for multi-chip devices, according to some embodiments.

FIG. 16 is a high-level flowchart illustrating various methods and techniques to implement using cross-chip data to perform on-chip throttling management, according to some embodiments.

FIG. 18 is a high-level flowchart illustrating various methods and techniques to implement a watchdog timer for detecting liveness of a software-based activity monitor that configures the throttling of the hardware-based activity monitor, according to some embodiments.

FIG. 20 is a high-level flowchart illustrating dynamic remapping for a multi-level action table for throttling criteria at a hardware-based activity monitor, according to some embodiments.

Figure 1:
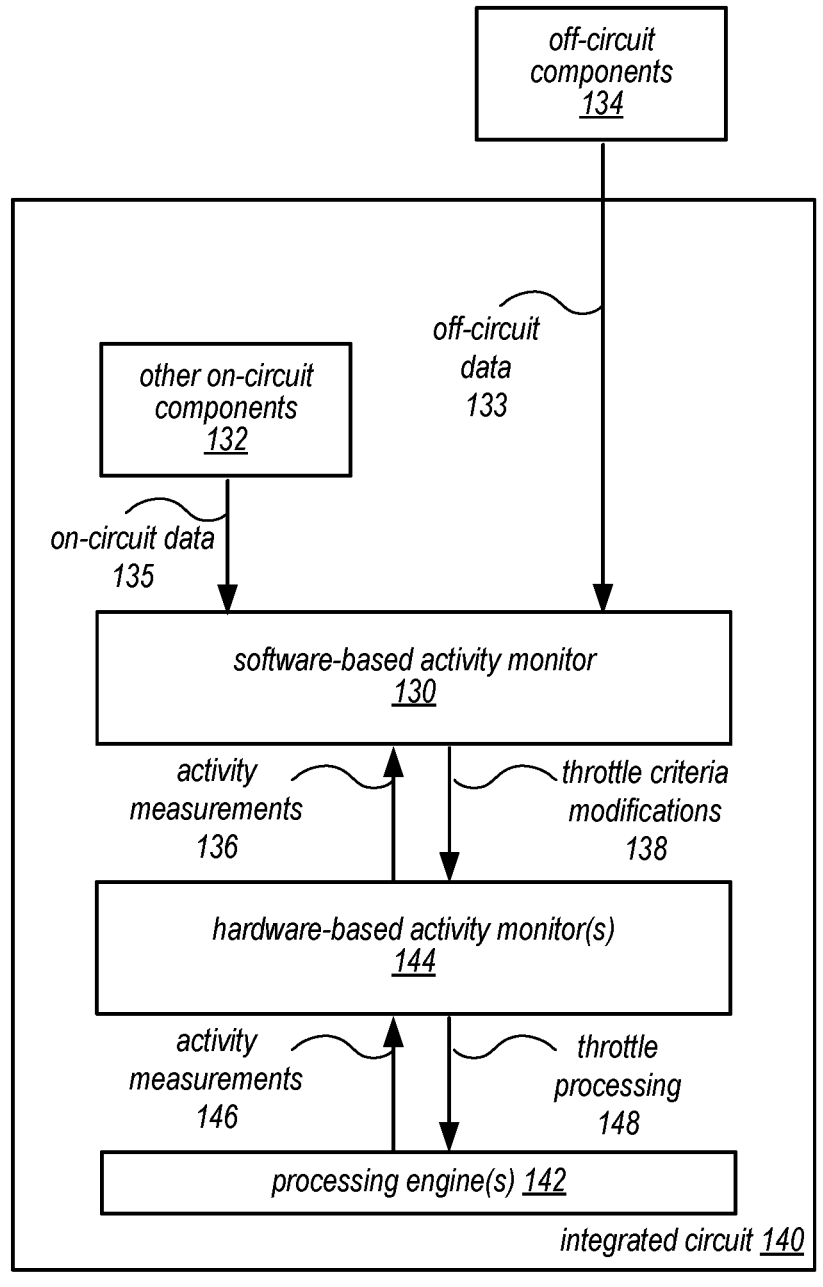
FIG. 1 illustrates a logical block diagram of an on-chip software-based activity monitor to configure throttling at a hardware-based activity monitor, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote e structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques of an on-chip software-based activity monitor to configure throttling at a hardware-based activity monitor are described herein. In various embodiments, power use of integrated circuits to perform various processing operations may be controlled to prevent problematic conditions, such as the various examples of problematic power conditions discussed below. Throttling techniques which control the rate of processing (e.g., by controlling the rate at which data is provided for processing) may be implemented in order to change the amount of power used by an integrated circuit, in some embodiments. Some problematic power conditions, however, can occur quickly. In order to protect against these problematic power conditions, on-chip activity monitoring for integrated circuit processing may be implemented in order to determine when to perform throttling, in some embodiments.

Some types of processing may be particularly susceptible to problematic power conditions. Machine learning, for instance, may involve performing a large number of operations (e.g., for neural network calculations) in parallel. As the number of these operations could change quickly over time, the power usage to perform these operations could also change quickly. Moreover, machine learning is also an example of processing where it is difficult for control systems to determine a workload that may be caused based on requests to perform machine learning tasks. Instead, the nature of input data, including the patterns or other changes to input data over time, may further exacerbate power demands to complete processing operations. Malicious actors, for instance, could cause problematic power conditions via power viruses or other modifications to input data patterns, thereby exceeding the capacity of processing resources to perform requested tasks.

Various problematic power conditions can occur. For example, one problematic power condition may be a temporary peaking of current (e.g., a current rate of change (di/dt) event). Temporary peaking of current could be unsustainable for integrated circuit decoupling capacitors (e.g., on-chip, on-package, and on-board). Another example problematic power condition may be continuous current due to very high sustained activity that a voltage regulator cannot sustain. Another example problematic power condition may be for high, long-term activity that causes a junction temperature to approach levels where a thermal system cannot cool a device implementing the integrated circuit. In various embodiments, on-chip software-based activity monitor to configure throttling at a hardware-based activity monitor may be implemented to prevent problematic power conditions, like those discussed above, as on-circuit activity monitoring may be able to quickly detect and respond to workloads that lead to problematic power conditions. In this way machine learning processing or other types of susceptible processing can implement hardware-based defenses and mitigation techniques to reduce or eliminate the occurrence of problematic power conditions.

Further complicating power management to prevent problematic power conditions are the common architectures utilized to implement processing. For example, multi-chip modules (MCMs) may implement multiple integrated circuits that utilize a common substrate to work together to perform processing workloads. For example, multiple integrated circuits may implement one or more respective processing engines which, along with other components as part of the integrated circuits, such as memory, may be used to increase the performance capabilities of a system beyond the implementation of a single integrated circuit device. In order to facilitate power management that accounts for a global view (e.g., of the entire multi-chip module), additional activity monitoring may be implemented. In various embodiments, a software-based activity monitor may be implemented on an integrated circuit (e.g., by executing firmware or other instructions on a processing component) which may interact with both hardware-based activity monitors on the same integrated circuit as well as other external components (other software-based activity monitors on other integrated circuits as part of the MCM and/or hardware-based activity monitors on other integrated circuits as part of the MCM). In this way, more complex throttling and other power management logic that accounts for the global view of the MCM may be implemented without sacrificing the speed and responsiveness provided by the hardware-based activity monitors, which may actually still perform the detection and application of throttling in the event of problematic power conditions.

FIG. 1 illustrates a logical block diagram of an on-chip software-based activity monitor to configure throttling at a hardware-based activity monitor, according to some embodiments. Integrated circuit 140 may be implemented as part of a device (e.g., board, card, or multi-chip module). Integrated circuit 140 may be an application specific integrated circuit (ASIC), field programmable gate array (FPGA), system-on-a-chip (SoC), or any other dedicated circuitry that performs processing 142 for various tasks (e.g., training and/or inference tasks for machine learning models using a systolic array as discussed below with regard to FIGS. 2-12). In some embodiments, other integrated circuits (not illustrated) may also be implemented as part of the same device, which may implement similar features, such as software-based activity monitor 130 and hardware-based activity monitor 144, such as the multiple dies 230 of machine learning inference accelerator 220 discussed below with regard to FIGS. 2 and 3.

As illustrated in FIG. 1, integrated circuit 140 may implement a software-based activity monitor 130. As noted above, software-based activity monitor 130 may be implemented by programming instructions, such as firmware, that are executed by a processing component (e.g., a dedicated processor for software-based activity monitor 130) which may implement a control loop or other logic to collect data from various sources, such as on-circuit data 135 from other on-circuit components 132 and/or off-circuit data 133 from off-circuit components 134, and activity measurements 136 from hardware-based activity measurements 136 from hardware-based activity monitor(s) 144, and determine whether any modifications to throttling performed by hardware-based activity monitor(s) 144 should be performed. For example, if multiple processing engine(s) 142 are executing with different workloads, more power may be allocated to one processing engine over another by raising the limits before throttling is applied to the busier processing engine and lowering the limits before throttling is applied at the less busy processing engine. Because software-based activity monitor 130 does not directly perform throttling, throttling criteria (which may be used by the hardware-based activity monitor(s) 144 to detect and apply throttling at processing engine(s) 142) may be modified, as indicated at 138 in order to accomplish these and other dynamic power management scenarios. Because hardware-based activity monitor(s) 144 are still taking activity measurements 146 and performing throttling of processing 148, the speed and responsiveness of throttling to control power usage may remain high. Moreover, because software-based activity monitor 130 is implemented on integrated circuit 140 (e.g., "on-chip"), any modifications to throttling criteria 138 that do need to be made can be performed quickly (e.g., on the order of microseconds) as opposed to waiting on longer latency times to communicate with an off-chip microcontroller or other component which may be in the 100s of milliseconds).

Software-based activity monitor 130 can increase the capabilities of hardware-based activity monitor(s) 144 without actually adding additional complexity in the hardware-based activity monitors themselves (e.g., adding additional circuitry that consumes more of the space and power budgets of integrated circuit 140). For example, the shorter feedback latency between hardware-based activity monitor(s) 144 and software-based activity monitor 130 may allow for the incorporation of external and internal component sensor data. For example, other on-circuit components 132 could provide information such as one or more process detector sensors to obtain data that indicates process variation and one or more temperature sensors to obtain temperature information, which may be provided as on-circuit data 135. Similarly, off-circuit components, such as a voltage regulator can be monitored directly to obtain power readings, allowing for dynamic throttling adjustments based on the power consumed by integrated circuit 140, as may be provided by off-circuit data 133. Off-circuit components 134 may also allow for global data for a multi-chip module to be obtained from other integrated circuits implementing processing engines via other software-based activity monitors, as discussed in detail below with regard to FIGS. 3, 14, 15, and 16, in order to coordinate throttling decisions across multiple integrated circuits (e.g., allowing for power usage to be distributed differently in different scenarios).

Software-based activity monitor 130 may also provide greater throttling availability. For example, unlike an external microcontroller which may have to be rebooted and updated, taking the external microcontroller offline for one or more minutes, software-based activity monitor 130 may be always available. Moreover, in embodiments where cross-circuit throttling is implemented, as discussed in detail below with regard to FIGS. 3, 14, 15, and 16, other software-based activity monitors may be able to function as the software-based hardware activity monitor 130 in the event the monitor 130 is being updated with different programming instructions, avoiding fixed or other less nuanced throttling schemes that would be applied by hardware-based activity monitor(s) 144 alone. Moreover, as discussed in detail below with regard to FIGS. 5, 17 and 18, a watchdog timer may be implemented by hardware-based activity monitor(s) 144 in some embodiments to detect those scenarios where software-based activity monitor is unavailable.

Because software-based activity monitor 130 can quickly respond to changing conditions based on provided activity measurements 136, on-circuit data 135 and off-circuit data 133, in some embodiments, software-based activity monitor 130 may utilize efficient techniques for distributing throttle criteria modifications 138. For example, as discussed in detail below with regard to FIGS. 7, 8, 11, 19, 20, and 21, a single write to a remapping sub-table of a multi-level action table may be performed in order to change throttling criteria that are applied by hardware-based activity monitors 144.

This specification continues with general descriptions of an integrated circuit that is implemented as part of a machine learning accelerator device, which may implement a systolic array to perform machine learning operations throttling for the systolic array to modify systolic array processing using software-based and hardware-based activity monitors. Various examples of different components/modules, or arrangements of components/modules that may be implemented in or along with the software-based and hardware-based activity monitors may then be discussed. A number of different methods and techniques to implement on-chip software-based activity monitor to configure throttling at a hardware-based activity monitor are then discussed, some of which are illustrated in an accompanying flowchart. Various examples are provided throughout the specification.

Figure 2:
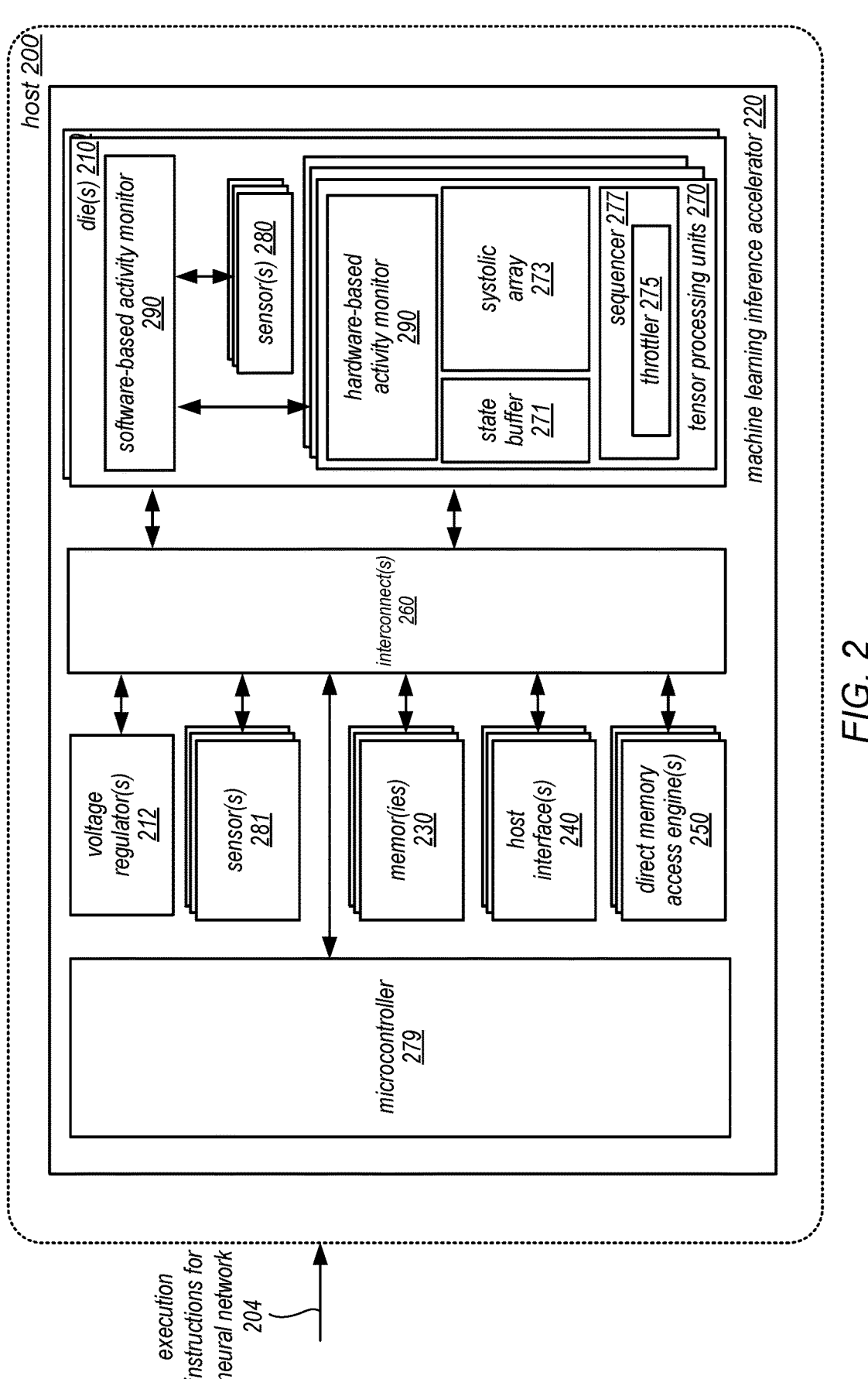
FIG. 2 is a logical block diagram illustrating a host that handles instructions to a machine learning accelerator with an on-chip software-based activity monitor to configure throttling at a hardware-based activity monitor for modifying machine learning accelerator processing, according to some embodiments.

FIG. 2 is a logical block diagram illustrating a host that handles instructions to a machine learning accelerator with an on-chip software-based activity monitor to configure throttling at a hardware-based activity monitor for modifying machine learning accelerator processing, according to some embodiments. Host 200 may be a computing system, like computing system 3000 discussed below with regard to FIG. 22 or other computing platform that may implement machine learning inference accelerator 220 to support and/or perform various machine learning tasks. For example, a neural network compiler may receive a neural network and generate execution instructions 204 to execute the neural network on processing units, such as tensor processing units 270 implemented as part of machine learning inference accelerator 220. Host 200 may implement an interface (not illustrated) via which instructions for the neural network 204 may be received (e.g., a command or instruction that triggers an upload protocol or file transfer for the neural network). In some embodiments host 200 may be implemented as part of a network-based service that offers client applications the capability to create, train, upload and/or execute neural networks on service computing resources which may be selected based on their hardware and/or software capabilities to support different types of neural network applications (e.g., image recognition, speech recognition, sentiment recognition, prediction, etc.). In some embodiments (not illustrated) a neural network compiler may be implemented on a same host as machine learning inference accelerator 220 and the execution instructions may be provided 204 over internal communications paths (e.g., a bus or other interconnect). In some embodiments, execution instructions 204 may be received over a network connection between two hosts to allow machine learning inference accelerator 220 to load and execute the neural network.

Machine learning inference accelerator 220 (or portions thereof, such as individual tensor processing units 270) may be implemented as an integrated circuit on respective dies 210, such as an application specific integrated circuit (ASIC), field programmable gate array (FPGA), system-on-a-chip (SoC), or other dedicated circuitry. Machine learning inference accelerator 220 may implement host interface(s) 240 to receive instructions and weights to execute a neural network. For example, host interface(s) 240 may include Peripheral Component Interconnect Express (PCIe) interface that can receive the instructions 204 and load them to memor(ies) 230. Similarly, host interface(s) 240 may support various communications for managing the performance of machine learning inference accelerator 220. For example, power management may be implemented as part of host 200 on a microcontroller 279 executing management firmware as part of a circuit board on which machine learning inference accelerator 220 is mounted that may receive various sensor measurements from sensors 281 (e.g., temperature or other environmental conditions) to determine conditions or scenarios in which throttling instructions may be sent (e.g., by writing software-based throttling recommendations as discussed below). In some embodiments, a host processor (not illustrated), such as a CPU, may also send or otherwise signal throttling recommendations.

Figure 22:
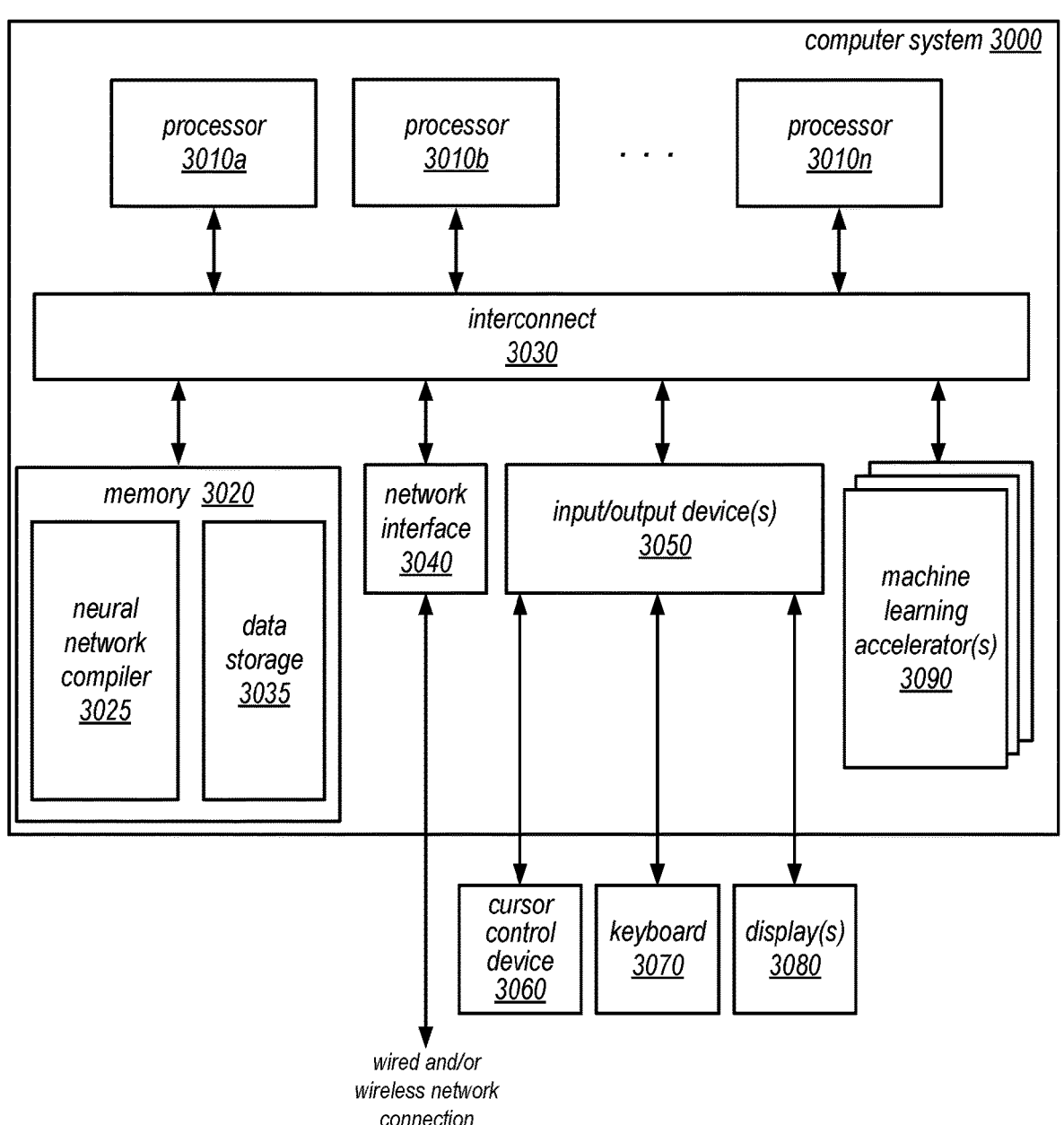
FIG. 22 is an example computer system, according to some embodiments.

In some embodiments, machine learning inference accelerator 220 may implement memor(ies) 230, such as Dynamic Random Access Memory (DRAM), high bandwidth memory, or other memory technologies, such as memory 2020 discussed below with regard to FIG. 22. Memor (ies) 230 may store instructions, weights and other data for performing training and/or inferencing on a neural network (e.g., the input data for evaluation, such as input images for image recognition). In some embodiments, machine learning inference accelerator 220 may implement interconnect(s) 260 to support communication amongst machine learning inference accelerator 220 components (e.g., host interface(s) 240, memor(ies) 230, direct memory access engine(s) 250, voltage regulator(s) 212, sensor(s) 281 and die(s) 210). Interconnect(s) 260 may implement many different kinds of bus architectures, such as an AXI fabric. In some embodiments, machine learning inference accelerator 220 may implement direct memory access (DMA) engine(s) 250. Direct memory access engine(s) 250 may support actions by tensor processing units 270 to, for instance, read, write, load, store, or otherwise access memor(ies) 230 to execute a neural network.

Figure 3:
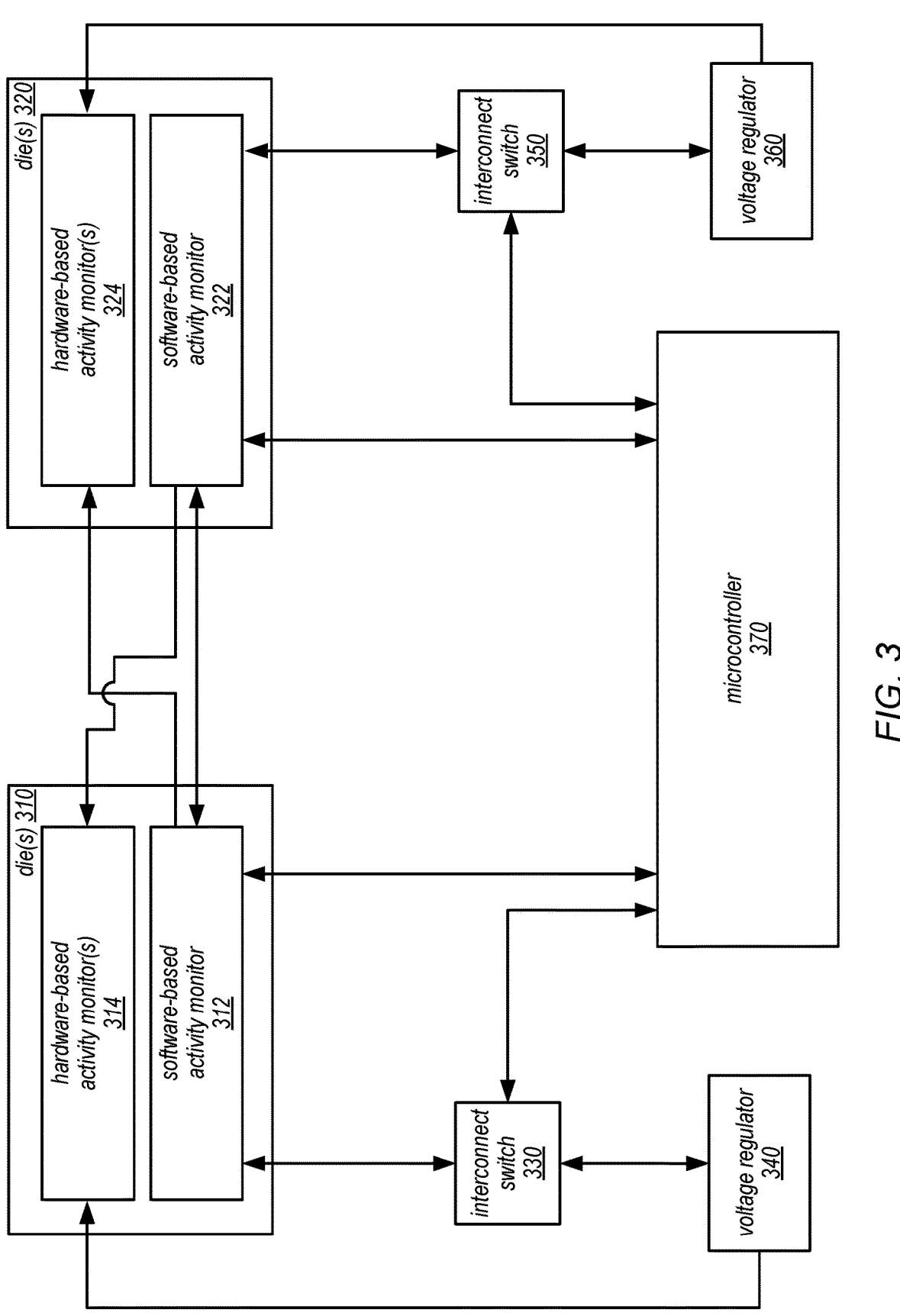
FIG. 3 is a logical block diagram illustrating an example layout for multiple dies that include respective tensor processing units to facilitate communication between activity monitors on the dies, according to some embodiments.

In some embodiments, machine learning inference accelerator 220 may be a board, card, or other multi-chip module (MCM) which may implement multiple die(s) 210, that respectively implement one or more tensor processing units 270 to perform various calculations in order to execute a neural network. FIGS. 3-4B, discussed below, provide example numbers and layouts of dies 210 and tensor processing units 270 which may be implemented in various embodiments. Tensor processing units 270 may implement sequencer 277 which may obtain and decode the execution instructions 204 for the operations assigned to the tensor processing unit from memor(ies) 230. Sequencer 277 may use direct memory accessing engine(s) 250 to loads the weights and other information into state buffer 271 (which may be an on-chip memory, such as SRAM that acts as a dedicated cache for an individual tensor processing unit 270). As discussed below in detail with regard to FIGS. 5 and 6, sequencer 277 may implement throttler 275 which may perform throttling modify the rate at which data is input to systolic array via state buffer 271. In some embodiments, different tensor processing units may have different sizes of dedicated cache (and/or different sizes or shapes of a systolic array).

Tensor processing unit 270 may implement a systolic array 273 of processing elements which perform the operations of the neural network according to the weights in state buffer. Different systolic arrays may be differently shaped (e.g., longer horizontally than vertically, or vice versa, as well as square shaped), in some embodiments providing a different processing capacity. These processing elements may execute operations, such as multiply and accumulate operations and then pass input data and weights to other elements in the array 273 for further processing. After array calculations the data may be passed to other functional units (not illustrated). For instance, after the systolic array 273, the data may go through normalization and then activation, which is a non-linear sum of the partial products (e.g. tanh or reLU). Data, such as input feature maps, filters, and output features may be processed through systolic array 273. Results may loop back through state buffer 271 for additional processing or pass through additional calculations at the output of the systolic array 273.

Dies 210 may implement on-chip sensor(s) 280, in various embodiments. On-chip sensors 280 may capture measurements related to voltage and temperature. Other sensors external to die(s) 210 may be implemented, such as sensor(s) 281, which may also capture measurements related to voltage and temperature, in some embodiments. For example, between the different sensor(s) 281 and 280, measurements related to voltage regulator power, voltage regulator temperature, mezzanine temperature, high bandwidth (HBM) memory temperature, SOC temperature, SOC voltage, may be captured, among other measurements.

Tensor processing units 270 may implement respective hardware-based activity monitors 290, in various embodiments, to provide on-chip monitoring and throttling in response to the activity on systolic array 273. As discussed above with regard to FIG. 1, and in detail below with regard to FIGS. 3-4B and 13-21, a software-based activity monitor 290 implemented on die(s) 210 may communicate with hardware-based activity monitor 290 to modify throttling criteria.

FIG. 3 is a logical block diagram illustrating an example layout for multiple dies that include respective tensor processing units to facilitate communication between activity monitors on the dies, according to some embodiments. Die(s) 310 and 320, which may be similar to die(s) 210 in FIG. 2, may implement respective software-based activity monitor(s) 312 and 322, which may implement control loops to obtain and make throttling criteria modifications as discussed above with regard to FIG. 1 and in detail below with regard to FIGS. 13-21.

In the example layout, each die 310 and 320 may have its own respective voltage regulator 340 and 360 respectively for regulating voltage and which may signal (among other communications) over-current warnings and over-temperature warnings to the hardware-based activity monitors 314 and 324 respectively (e.g., via General Purpose Input/Output (GPIO) signal pins) to cause throttling. Software-based activity monitors 312 and 322 may communicate with the voltage regulator(s) 340 and 360 using respective interconnect switches 330 and 350, such as the Inter-integrated circuit ($I^2C$) communication bus (which may also facilitate communication between voltage regulator(s) 340 and 360 and microcontroller 370 (which may be similar to microcontroller 279 in FIG. 2) to obtain power readings as part of collecting data to make dynamic throttling recommendations. Microcontroller 370 may communicate directly with software-based activity monitors 312 and 322 using techniques, such as a Serial Peripheral Interface (SPI) to support various management operations with respect to software-based activity monitors (e.g., loading new firmware).

Software-based activity monitor 312 may communicate with software-based activity monitor 322, in various embodiments. For example, GPIOs may be implemented to indicate from one software-based activity monitor to another that the software-based activity monitor is alive (e.g., by toggling the GPIO), a current throttling state (e.g., critical, cool, warm, inactive). As depicted in FIG. 3, software-based activity monitors may also communicate directly with the hardware-based activity monitors in another die in order to directly trigger throttling. For example, a GPIO from software-based activity monitor 312 to hardware-based activity monitors 324 may be used to trigger throttling in the event that software-based activity monitor 322 is unavailable. A software-based activity monitor may use Advanced Peripheral Bus (APB) may be used to read, write, or clear GPIO outputs at a GPIO controller, in some embodiments.

Below are example signal formats for the above discussed communications using GPIOs, where:

SOFTWARE_ACTIVITY_MONITOR_STATE_OUT [1:0]

Outputs set by the local software-based activity monitor to indicate to the remote software-based activity monitor the local die's current thermal/power state. The thermal/power state is software-defined (an example would be: 11—cool, 10—warm, 01—thermal warning, 00—thermal critical)·

SOFTWARE_ACTIVITY_MONITOR_ALIVE_OUT

Output toggled by the local software-based activity monitor once per second (or any appropriate period) to indicate to the remote software-based activity monitor and to the microcontroller 370 that the local software-based activity monitor is alive.

SOFTWARE_ACTIVITY_MONITOR_THROTTLE_OUT_N

Output set by the local software-based activity monitor to trigger throttling in the hardware-based activity monitors on the remote die (i.e. 1—No throttling, 0—Throttle)·

SOFTWARE_ACTIVITY_MONITOR_STATE_IN [1:0]

Inputs set by the remote software-based activity monitor to indicate to the local software-based activity monitor the remote die's thermal/power state.

SOFTWARE_ACTIVITY_MONITOR_ALIVE_IN

Figure 4A:
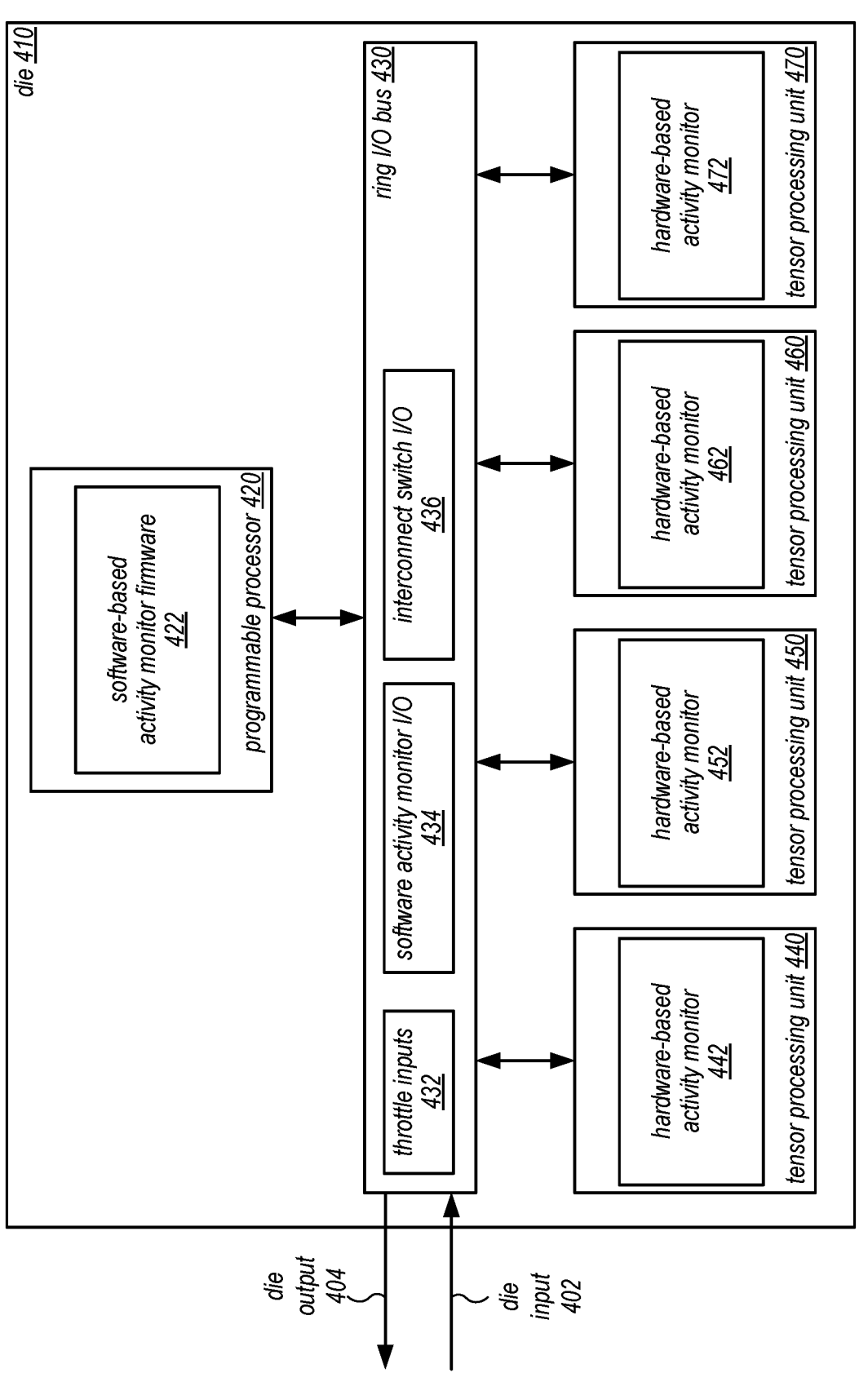
FIGS. 4A and 4B illustrate an example layout of a die that implements a software-based activity monitor and hardware-based activity monitors, according to some embodiments.
Figure 4B:
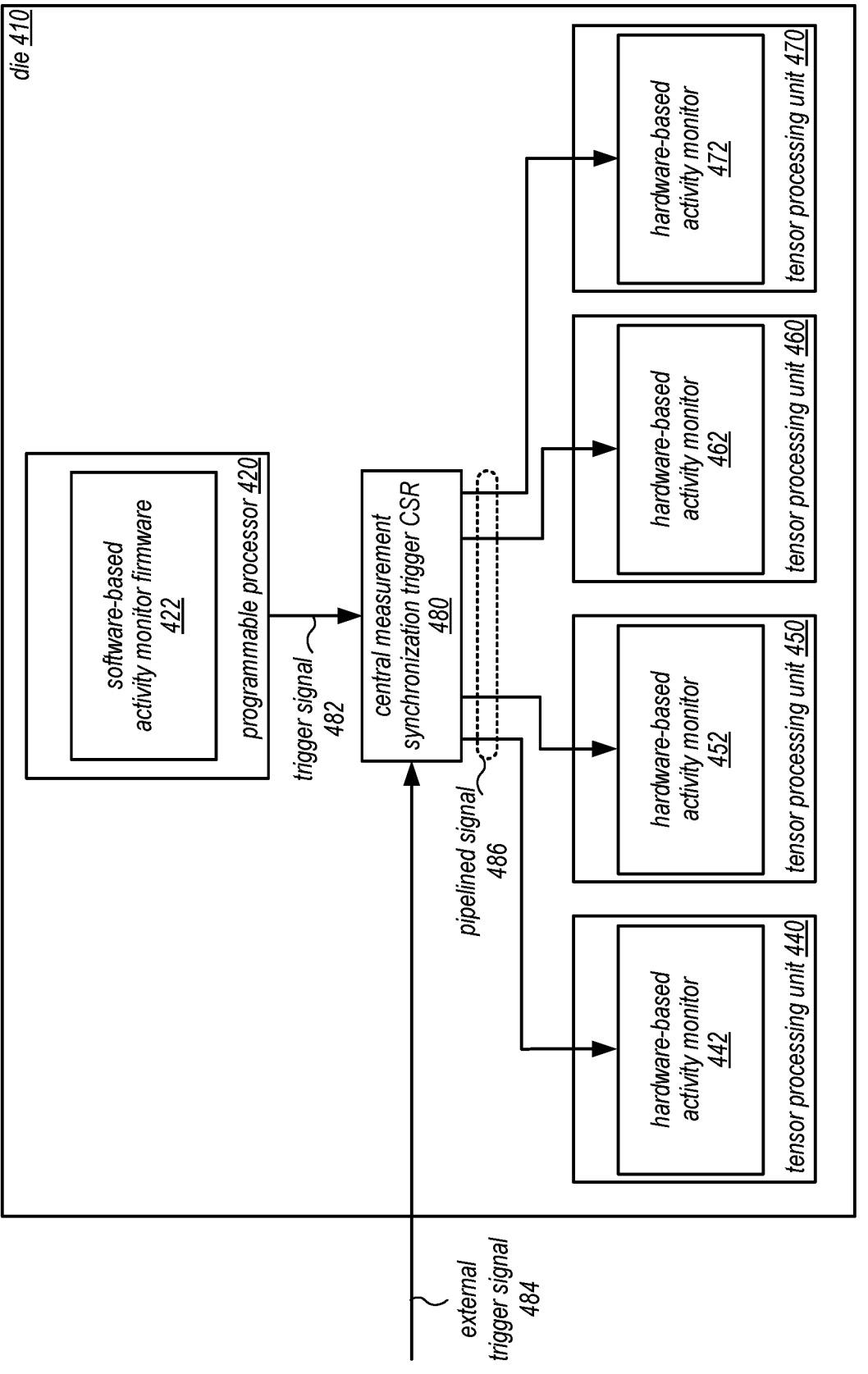

Input toggled by the remote software-based activity monitor once per second (or any appropriate period) to indicate to the local software-based activity monitor and to the microcontroller 370 that the remote software-based activity monitor is alive FIGS. 4A and 4B illustrate an example layout of a die that implements a software-based activity monitor and hardware-based activity monitors, according to some embodiments. In FIG. 4A, die 410 may be similar to dies 310 and 320 in FIG. 3 and dies 210 of FIG. 2. Programmable processor 420 may be a dedicated processor for executing software-based activity monitor firmware 422 to implement the various features of a software-based activity monitor. Die 410 may implement an interconnect, such as ring I/O bus 430 which may support die input 402 and die output to the various hardware-based activity monitors corresponding to each tensor processing unit, hardware-based activity monitor 442 for tensor processing unit 440 (similar to tensor processing units 270 in FIG. 2), hardware-based activity monitor 452 for tensor processing unit 450, hardware-based activity monitor 462 for tensor processing unit 460, and hardware-based activity monitor 472 for tensor processing unit 470, and software-based activity monitor firmware 422.

As illustrated in ring I/O bus 430, various inputs and outputs may be implemented. For example, throttle inputs 432 may be implemented. Throttle inputs 432 may be respectively wired to each hardware-based activity monitor 442, 452, 462, and 472, providing, for example GPIOs wired from a GPIO controller to each of the hardware-based activity monitors to instruct throttling. For example, the GPIO is low, the associated GPIO Monitor will recommend the K and N throttling specified in the Control Status Registers (CSRs) for that GPIO Monitor in the hardware-based activity monitor. When the GPIO is high, the associated GPIO Monitor will not recommend any throttling. Software-based activity monitor I/O 434 may include the various communications between software-based activity monitors discussed above with regard to FIG. 3 (e.g., to indicate from one software-based activity monitor to another that the software-based activity monitor is alive and provide a current throttling state (e.g., critical, cool, warm, inactive). Interconnect switch I/O 436 may support communications between a software-based activity monitor and the voltage regulators through an interconnect switch as discussed above with regard to FIG. 3.

FIG. 4B illustrates an example of centralized measurement synchronization trigger across the different hardware-based activity monitors. In some embodiments, it is desirable that the monitor periods in all the hardware-based activity monitors on a die be synchronized so that when the software-based activity monitor reads the activity occurring in each tensor processing unit, the activity represents what is occurring over the same time period. To accomplish this a hardware-based activity monitor synchronization rigger CSR 480 (e.g., using four bits, one for each hardware-based activity monitor 442, 452, 462, and 472). When the microcontroller (e.g., 370 in FIG. 3) or software-based activity monitor firmware 422 writes 482 one or more of these bits, a trigger pulse will be sent in pipelined fashion 486 across the die to one or more of the hardware-based activity monitors 442, 452, 462, and 472. Each of the hardware-based activity monitors 442, 452, 462, and 472 that receive a pulse will re-start the monitor period for all monitors that are currently enabled. The trigger signal pipelines will be balanced such that all the monitors will start on the same clock cycle, in various embodiments.

Figure 5:
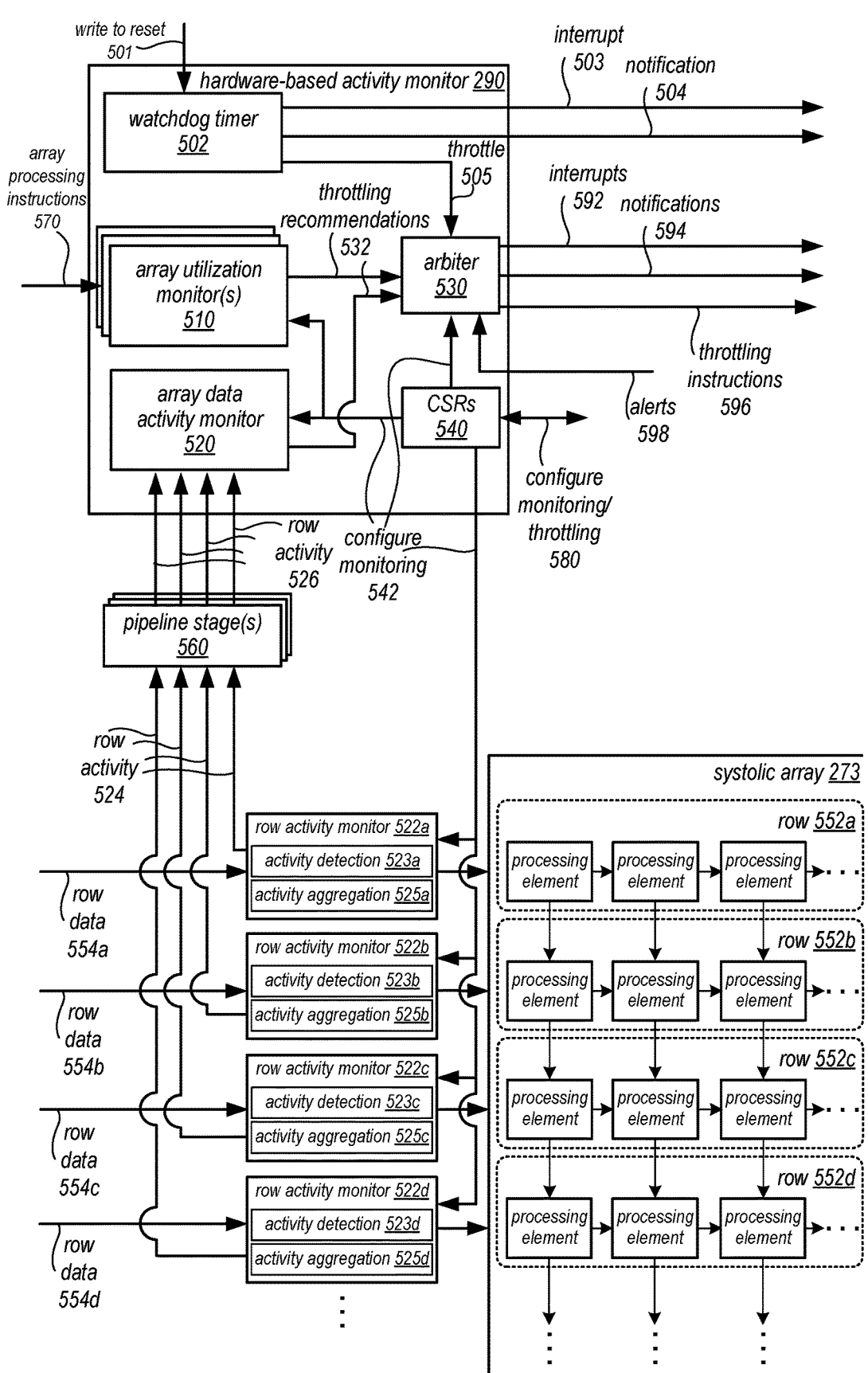
FIG. 5 is a logical block diagram illustrating an activity monitor for detecting changes in activity measurements to modify integrated circuit processing, according to some embodiments.

FIG. 5 is a logical block diagram illustrating an activity monitor for detecting changes in activity measurements to modify integrated circuit processing, according to some embodiments. Hardware-based activity monitor 290 may implement (and/or coordinate) one or multiple activity monitors around systolic array 273, in some embodiments, in order to measure various level of activity and make throttling recommendations based on the measure activity. For example, in some embodiments, the measure of activity may be measured over different time frames (e.g., short-term, medium-term, and long-term).

In some embodiments, different monitors may monitor different types of activity. For example, as illustrated in FIG. 5, hardware-based activity monitor 290 may implement array utilization monitor(s) 510 to determine average array utilization over one or more time periods, in some embodiments. Utilization monitor(s) 510 may, based, on the measured array utilization (e.g., based on a current level of utilization and previously measured level utilization), determine throttling recommendations. For example, array processing instructions 570 may be used to determine the utilization of the array, in some embodiments.

Figure 9:
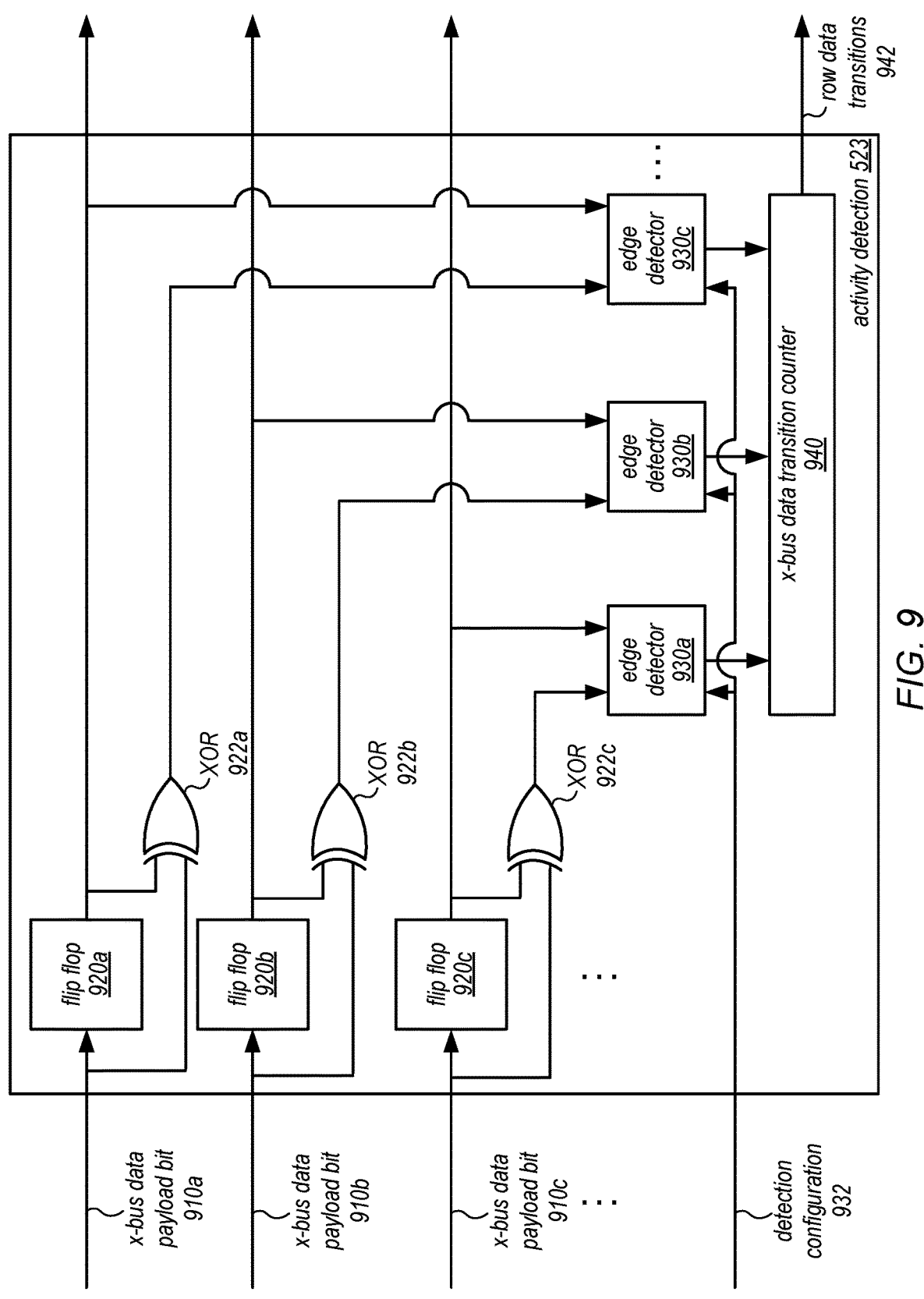
FIG. 9 is a logical block diagram illustrating data activity detection, according to some embodiments.
Figure 10:
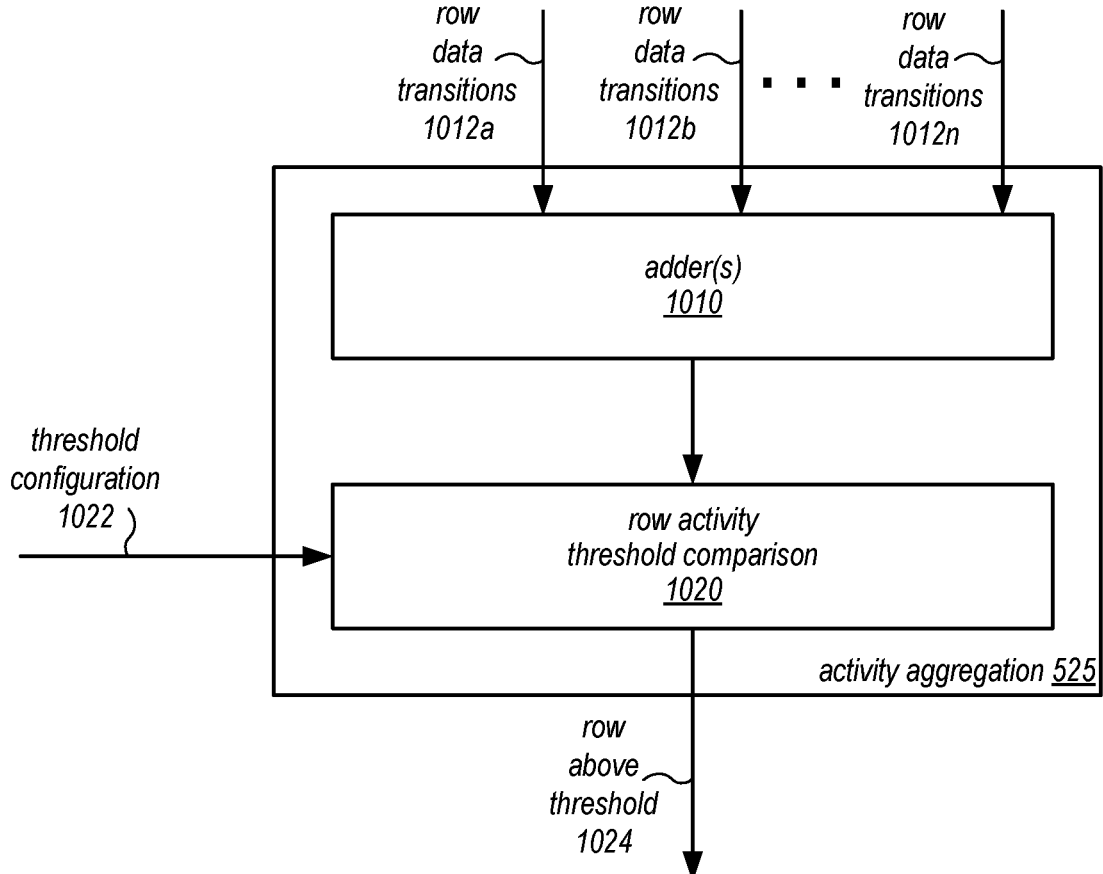
FIG. 10 is a logical block diagram illustrating an example of data activity aggregation, according to some embodiments.
Figure 11:
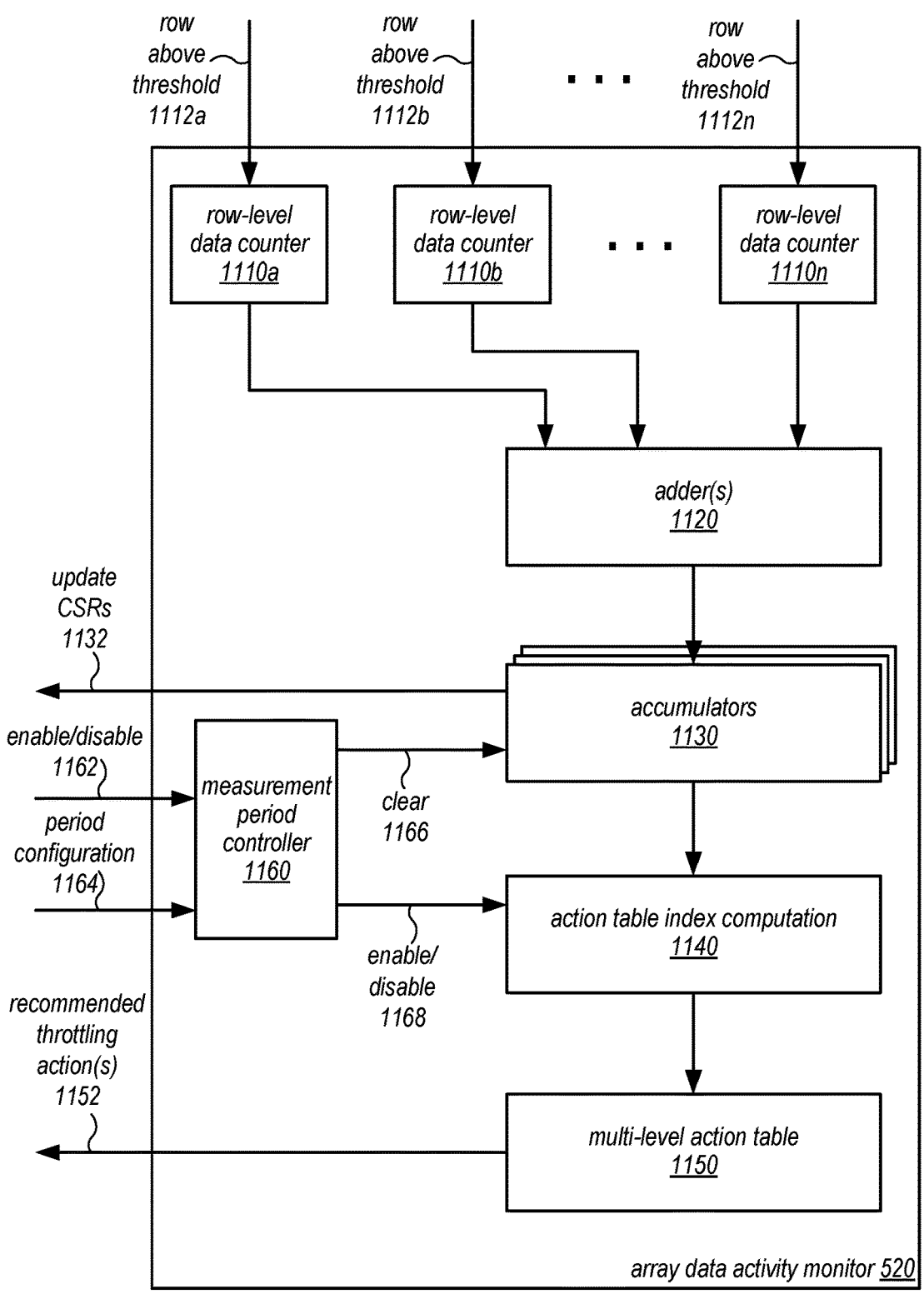
FIG. 11 is a logical block diagram illustrating an example array data activity monitor, according to some embodiments.

In another example of a type of monitored activity, activity monitor 290 may implement array data activity monitor 520. In various embodiments, array data activity monitor 520 may detect x-direction bus data activity over a period of time (as high x-direction bus data activity over a period of time may make a large impact on the power dissipation). In some embodiments, array data activity monitor 520 may receive row-level data activity information from respective row activity monitors, such as row activity monitor 522a, 522b, 522c, 522d, and so on, that measure, based on row data input for processing through respective processing elements of different rows of systolic array 273 (e.g., such as row data 554a input to row 552a, row data 554b input to row 552b, row data 554c input to row 552c, and row data 554d input to row 552d), as discussed in detail with regard to FIGS. 9-11 using activity detection 523, respectively illustrated for each row as 523a, 523b, 523c, 523d, and activity aggregation 525, respectively illustrated for each row as 525a, 525b, 525c, 525d. In some embodiments, activity monitor 290 may be instanced near "Row 0" of systolic array 273 in order to capture instructions entering rows that are co-located with "Row 0," such as "Row 32," "Row 64," and "Row 96." In some embodiments, row activity monitors 522 may be instanced in systolic array 273 itself (though illustrated outside systolic array 273 in FIG. 5) as part of "PRE/TAG" logic, or may be implemented as a pipeline stage prior to systolic array 273 (e.g., as illustrated in FIG. 5). FIGS. 9-11, discussed below, provide further detail of various techniques and features that may be implemented as part of array data activity monitor(s) 520.

Pipeline stage(s) 560 may be implemented, in some embodiments, in order to ensure that the activity on all of the x-direction busses on all the rows for a single clock cycle can be considered (e.g., summed up) together. In some embodiments, the number of pipeline stage(s) 560 may be based on an amount of time that a signal from a row activity 524, measured from the most distant row, takes to reach array data activity monitor 520. In some embodiments, pipeline stage(s) 560 may not be implemented (as activity measurements for row data may be aggregated over a number of cycles). Pipeline stage(s) 560 may, however, provide a way to verify if the row activity 524 measurements provided represent the total number of data transitions on a same cycle (or types of data transitions on a same cycle as discussed below with regard to FIGS. 9-11).

In some embodiments, control status registers (CSRs) 540 may be implemented as part of hardware-based activity monitor 290. CSRs 540 may support reads or writes performed as part of configuring the monitoring and throttling of hardware-based activity monitor 290, in some embodiments, as indicated at 580, and discussed in detail below with regard to FIG. 5. Configuration information from CSRs 540 may be used to configure monitoring, as indicated at 542, at array utilization monitor(s) 510, array data activity monitor 520, row activity monitors 522, and at arbiter 530, in some embodiments.

In some embodiments, where multiple types of activity measurements and events to perform throttling recommended and/or triggered by these events may be implemented, activity monitor 290 may implement techniques to decide whether to and how much to throttle. In at least some embodiments, activity monitor 290 may implement arbiter 530 to make throttling decisions and request throttling via throttling instructions 596. For example, array utilization monitor(s) 510 and array data activity monitor(s) 520 may provide throttling recommendations 532 to arbiter 530 (e.g., different respective throttling percentages). Arbiter 530 may implement various selection schemes for selecting a throttling amount to instruct. For example, in some embodiments, arbiter 530 may select a strongest or highest amount of throttling recommended. In at least some embodiments, arbiter may receive alerts 598 that may also indicate throttling events or recommendations directly from other hardware components, such as other sensors 280 or 281, as illustrated in FIG. 2. For example, one or more GPIO inputs may be used to signal alerts 598, such as active low and configured to operate as level inputs, (e.g., throttle when low, release throttle when high), or to operate as sticky (e.g., throttle when low and continue throttling until cleared (e.g., by a microcontroller or externally executing software) regardless of whether the GPIO input goes high). Alerts 598 may be triggered by board-level conditions, such as a voltage regulator-over current warning, in some embodiments. External power management (e.g., microcontroller 279 in FIG. 2) may be able to make throttling recommendations via CSRs 540 to provide software-based throttling recommendations handled by activity monitor 290, in some embodiments.

Arbiter 530 may support sending various interrupts 592 and/or notifications 594, in some embodiments. For example, interrupts 592 may be signaled or otherwise sent to various status or other registers, management components, such as a microcontroller, or other components that make take actions responsive to receiving the interrupt using interrupt handling techniques. For example, an interrupt 592 may be a hardware-based interrupt to the execution of management code on a microcontroller to cause the micro-controller to execute different portions of management code to address the scenario indicated by the interrupt. Notifications 594 may be sent, in some embodiments, in order to provide information (e.g., statistics about throttling, changes to throttling, etc.) which may (or may not) trigger further responsive actions. For example, a notification 594 may be software-based notification sent to a microcontroller, which may store or otherwise retain the notification information until management software on the microcontroller performs tasks to evaluate or check for notifications. As described in the various action tables illustrated below, different throttling recommendations may cause the sending of interrupts 592 and/or notifications 594.

As illustrated in FIG. 5, hardware-based activity monitor 290 may implement watchdog timer 502. A software-based activity monitor may periodically write 501 to reset the watchdog timer 502 (e.g., with a particular value). In the event the watchdog timer is not reset, various responsive actions may be taken, as discussed in detail below with regard to FIGS. 17 and 18. For example, watchdog timer 502 may cause an interrupt to be generated and sent 503, notification 504, including various contextual metadata, and/or throttling 505 to be performed (e.g., using predefined watchdog throttling criteria).

Figure 6:
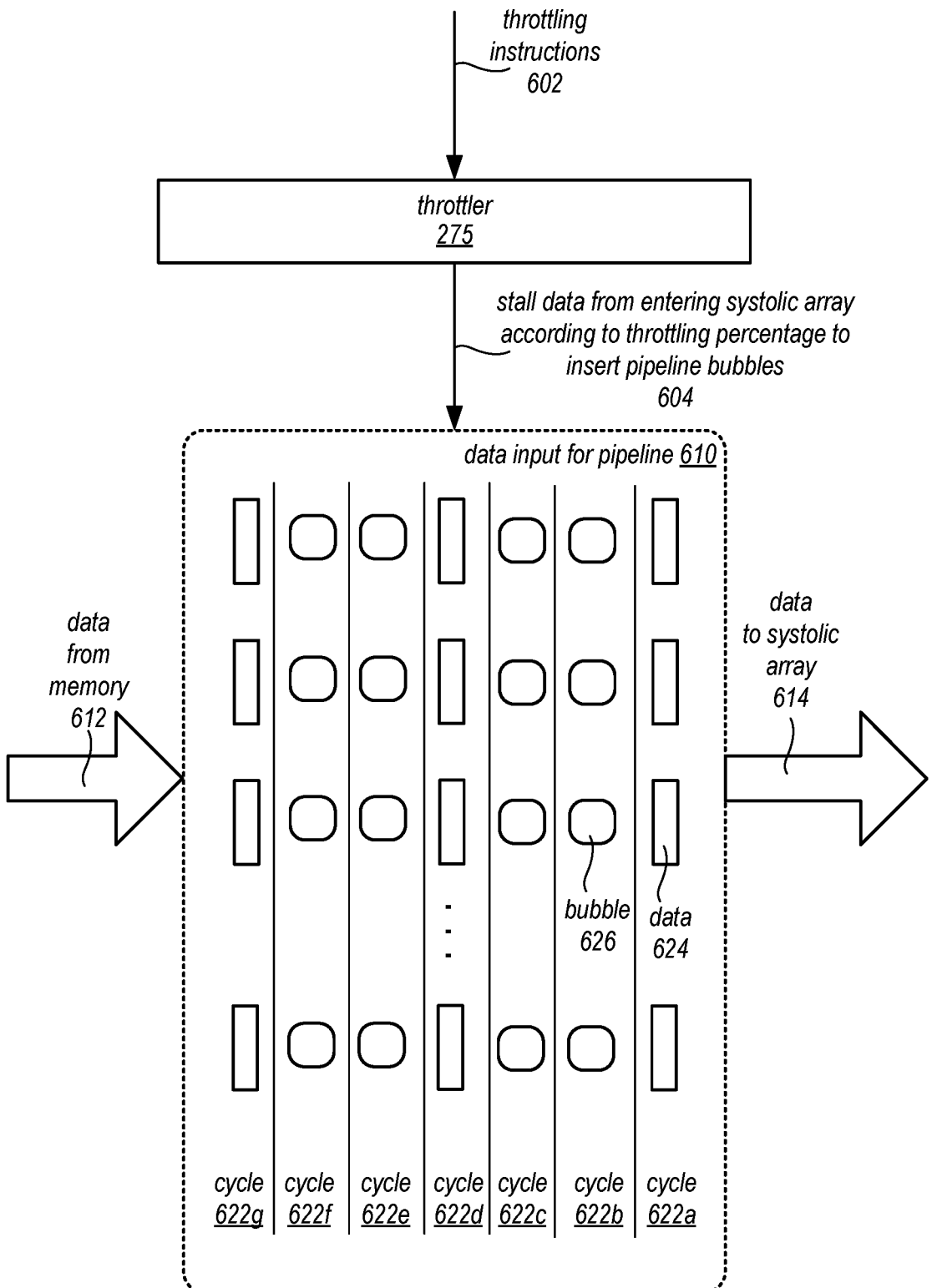
FIG. 6 is a logical block diagram illustrating a throttler for modifying integrated circuit processing, according to some embodiments.

As illustrated in FIG. 5, activity monitor 290 can send throttling instructions 596 (e.g., as determined by arbiter 530) to an interface for a throttler implemented for systolic array 273. FIG. 6 is a logical block diagram illustrating a throttler for modifying integrated circuit processing, according to some embodiments. Throttler 275 may implement an interface for accepting throttling instructions, like throttling instructions 602, which may be received from arbiter 530, in some embodiments. In some embodiments, throttler 275 may modify the rate at which data enters systolic array 273 in order to throttle processing at systolic array 273. For example, throttler 275 may, as indicated 604, stall data from entering the systolic array 273 according to a throttling percentage, specified in throttling instructions 602, in order to insert bubbles 626 into the processing pipeline for systolic array 273, in some embodiments.

In FIG. 6, it is shown that data obtained from memory 612 is input into the data pipeline, as indicated at 610 that is provided to systolic array 273, as indicated at 614. For some cycles, such as cycle 622*a*, 622*d*, and 622*g*, data (indicated by 624) for each row is obtained from memory 612 and provided 614 to systolic array 273. In this way, a throttling percentage (e.g., 30% or 1 of 3 cycles) is applied by throttler 275.

In some embodiments, a throttling percentage may be specified as part of throttling instructions 602. For example, throttler 275 may allow data to enter systolic array 273 for k cycles out of every n cycles. If there is no throttling applied, then data will be allowed to enter on every cycle (e.g., k=n). A throttling percentage of 50% may be specified, for instance, in different ways which, in turn, may result in different ways of throttling the same percentage. When throttling is specified as k=1, n=2, data will be enabled to enter the array for 1 cycle and then will be stalled for 1 cycle to create a bubble 626, and so on. When throttling is specified as k=50, n=100, also 50%, data will be enabled to enter the array for 50 cycles and then stalled for 50 cycles. As noted above in FIG. 2, as throttler 275 is implemented as part of sequencer 277, sequencer 277 may handle various edge cases or scenarios where a remaining amount of data is, for instance less than the specified 50 cycles.

Figure 7:
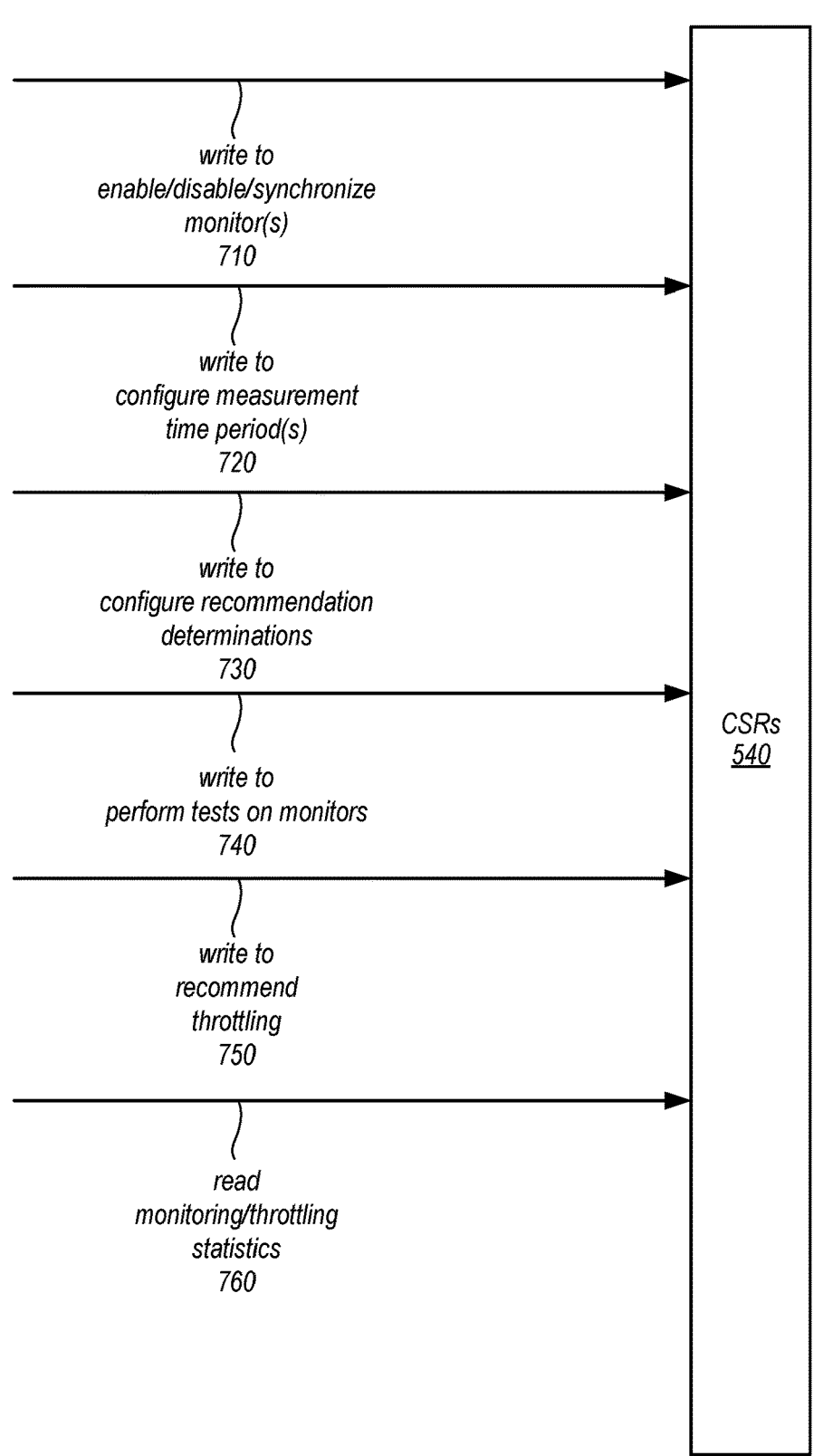
FIG. 7 is a logical block diagram illustrating interactions to configure activity monitoring, according to some embodiments.

As noted in FIG. 3, monitoring and throttling based on the monitoring can be configured by power management 212 or other components, in some embodiments, via CSRs 340. FIG. 7 is a logical block diagram illustrating interactions to configure activity monitoring, according to some embodiments. In some embodiments, CSRs 540 may be mapped into 4 KB space so that access can be blocked from the host system. Instead, utilization statistics can be shared with the host system in response to host requests using a host interface (or readless-read communication interface).

As indicated at 710, CSRs 540 may receive writes to enable or disable various monitors of activity monitor 290, in some embodiments. For example, one (or more, but not necessarily all) array utilization monitor(s) 310 could be enabled, and not array data activity monitor 320. In some scenarios, no monitors could be enabled, and in still other scenarios both types of monitors could be enabled. As discussed above with regard to FIG. 4B, a write or other signal may be sent to synchronize measurement periods for monitors.

As indicated at 720, CSRs 540 may receive writes to configure measurement time period(s), in some embodiments, for various monitors. For example, a length of period of time for array utilization or data activity may be specified in various units of measure for time (e.g., seconds, milliseconds, nanoseconds, and so on). Different monitors may collect and make throttling recommendations on the activity measured during the specified time period.

As indicated at 730, writes to configure recommendation determinations 730 may, in various embodiments, be received at CSRs 540. For example, monitors may utilize various throttling criteria, such as thresholds or other conditions to determine when and how much to throttle (e.g., throttling percentages), in various embodiments. In at least some embodiments, action tables may be used to map measurements to throttling recommendations (including no throttling). In those embodiments, writes to configure recommendation determinations 730 may cause corresponding changes in the action table(s).

As indicated at 740, CSRs 540 may receive writes to perform tests on monitors, in some embodiments. For example, writes may submit test values to be used in place of measurements to determine the behavior of monitors, arbiter, and/or throttling. As indicated at 750, CSRs 540 may receive writes to recommend throttling, in some embodiments. For example, power management 212 (or other component) may recommend throttling in response to various other conditions which are detected externally (e.g., off-chip). As indicated at 760, CSRs 540 may be read in order to obtain various monitoring and/or throttling statistics, in some embodiments. For example, statistics related to currently applied throttling, which monitor or other source's throttling recommendation was chosen, and how many times throttling has been applied because of a monitor (e.g., utilization or data activity), among other statistics or indicators of status.

Figure 8:
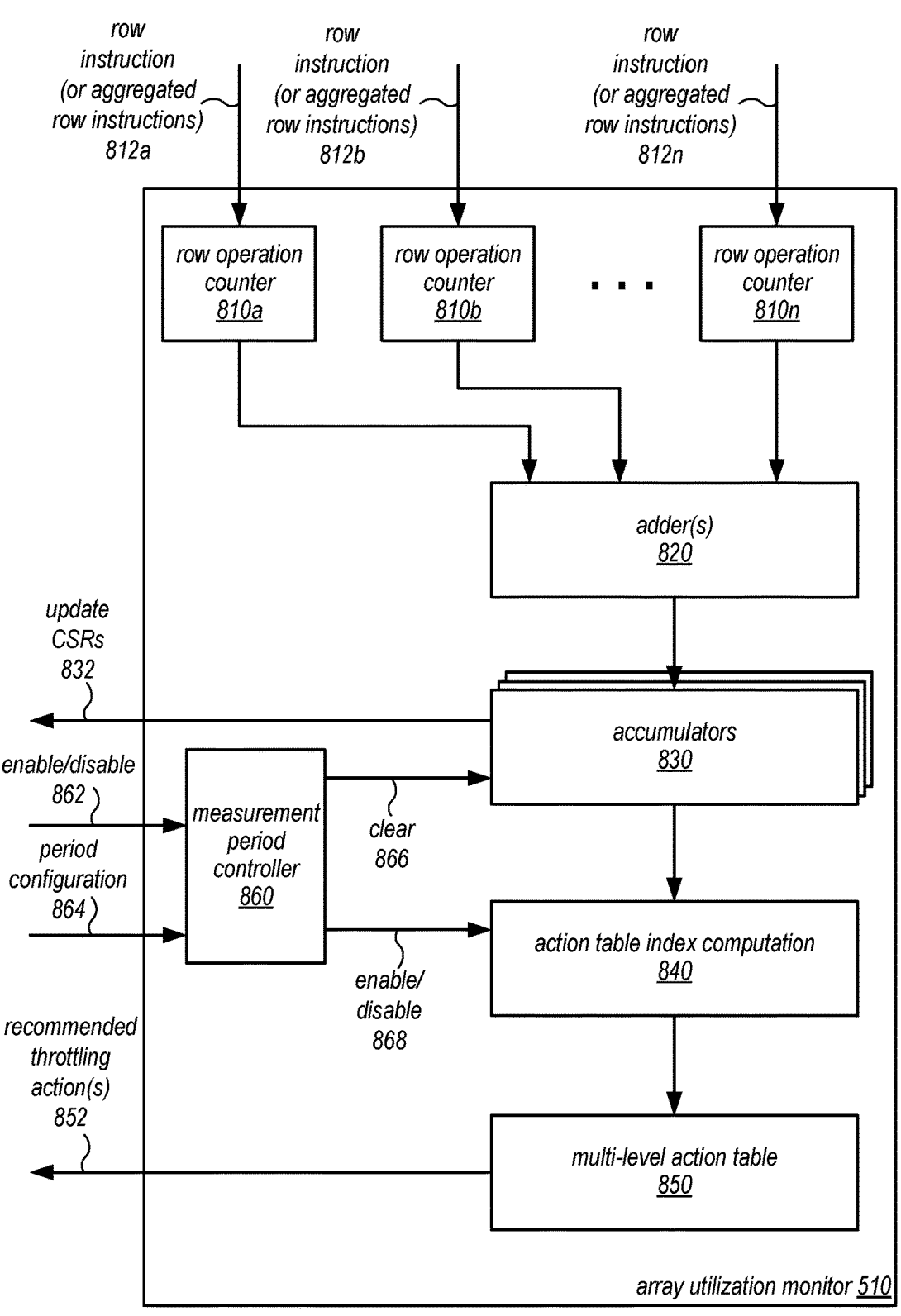
FIG. 8 is a logical block diagram illustrating an example utilization monitor, according to some embodiments.

As discussed above with regard to FIG. 3, one or multiple utilization monitors may be implemented as part of activity monitor 290. FIG. 8 is a logical block diagram illustrating an example utilization monitor, according to some embodiments. In various embodiments, a measurement of expected array utilization (without any throttling applied) may be determined according to an instruction for processing elements being executed as a wave of operations (e.g., matrix multiplies) start entering the systolic array. In this way, any throttling that is applied before matrix multiplies enter the systolic array may not affect the measurement of array utilization. The number of rows and columns in the systolic array may be known, so, in various embodiments, the array utilization may be may be measured as matrix multiplies enter the systolic array. For example, in FIG. 8, individual row instructions 812*a*, 812*b*, through 812*n* may be implemented to count at respective row counters 810*a*, 810*b*, through 810*n* a number of operations. One or more adders 820 may be used to combine the individual row counts into a single row count for a cycle to add to accumulator 830, in some embodiments.

In at least some embodiments, an array utilization measurement may indicate an actual or estimated number of processing elements active (e.g., performing an operation such as matrix multiply) on each cycle (or over a number of cycles in a time period). For example, in the case of neural network processing, if it is the case that ifmaps flow through all columns in a systolic array, the utilization measurement may be calculated according to the utilization of the first column of a tile (or the entire array) by counting matrix multiplies in the first column of each tile on each cycle. In other embodiments, all columns of processing elements may have utilization tracked (e.g., in scenarios where area, power, latency, or other design/performance considerations allow for additional logic to track all (or at least more) columns).

Array utilization may be determined in different ways. For example, in some embodiments, a numerical percentage may be calculated (e.g., X processing elements performing an operation out of Y total processing elements for a given cycle). In some embodiments, array utilization may be determined by adding a number of operations (e.g., matrix multiply operations) to an accumulator, such as one of accumulators 830, for every cycle when an operation enters the array based on the number of rows that will be utilized on that cycle so that a determination of usage for the processing elements in subsequent columns in the same row can be made (as the instructions entering a row may propagate to other processing elements in different columns in the same row). In some embodiments, array utilization may be a measurement over a period of time that is an average of individual cycle measurements. For instance, in the ifmap example given above, if ifmap data is staggered on different rows over the course of cycles when entering the systolic array, it may not be necessary to take the staggering into account (e.g., such as trying to count 4 rows on a first cycle, 8 rows on the second cycle, 12 rows on the third cycle, and so on) when determining the measurement. Instead, the array utilization can be based on matrix multiplies entering the first row and counting all rows that will be used for that wave, in some embodiments. In this way, array utilization monitor 310 may be able to determine current utilization of the systolic array independent of whether the systolic array is operating as a single tile or multiple tiles. As indicated at 832, a current accumulation (or an accumulation as the utilization measurement upon which a throttling recommendation is made) may be reported back by updating CSRs 540, as indicated at 832.

In various embodiments, multiple accumulators 830 may be implemented. Although in some embodiments, only one accumulator per hardware-based activity monitor may be implemented, this causes the measurement period and the throttling action period to be the same. At the end of a measurement, an action table lookup is done and throttling is applied. The throttling remains until the next measurement period completes. The throttling itself causes the activity in the next period to be lowered, so having the same measurement period as the throttling period can result in choppy, bang-bang control behavior (high throttle, no throttle, high throttle, no throttle). By adding more accumulators per hardware-based activity monitor with overlapping periods, the hardware-based activity monitor can react to activity increases quicker and can throttle for shorter periods of time and effectively throttle more proportionally to the activity level. By providing more accumulators per hardware-based activity monitor, the measurement period can match the time constant of the current delivery from the voltage regular or the time constant of the temperature rise/fall, but allow quicker reaction time to incremental increases in activity and give smoother throttling overall.

In some embodiments, hardware-based activity monitors can be configured to operate with a single accumulator or with multiple accumulators. In either mode, when the measurement period completes for a given accumulator, the hardware-based activity monitor will do a lookup into an action table for that hardware-based activity monitor. The following is an example description of using eight accumulators. Each of the eight accumulators may use the same measurement period (P), but their periods will be out-of-phase with each other as follows:

Accumulator 0 measures activity from time 0.000 to 1.000*P

Accumulator 1 measures activity from time 0.125*P to 1.125*P

Accumulator 2 measures activity from time 0.250*P to 1.250*P

Accumulator 3 measures activity from time 0.375*P to 1.375*P

Accumulator 4 measures activity from time 0.500*P to 1.500*P

Accumulator 5 measures activity from time 0.625*P to 1.625*P

Accumulator 6 measures activity from time 0.750*P to 1.750*P

Accumulator 7 measures activity from time 0.875*P to 1.875*P

As noted above, in some embodiments, an average array utilization may be determined. To determine the average array utilization, an array utilization monitor may count the number of matrix multiplies that enter the array over the course of a measurement time period (e.g., specified as a number of cycles or as various units of time, which may be used to determine the number of cycles). Array utilization monitor 510 may implement measurement period controller 860 in order to implement a measurement time period. For example, configuration information (e.g., which may be obtained or programmed through CSRs 540) may allow for monitoring as a whole to be enabled or disabled, as indicated at 862, and a period of time to be set, as indicated at period configuration 864. Measurement controller 860 may clear accumulator 830 when a measurement period is complete and may enable or disable action table lookups to enable or disable recommending throttling action(s) 852. In at least some embodiments, the measurement period may be programmable and support measurement time periods on the order of seconds (e.g., a 33-bit counter to allow $2^{33}/2.8$ GHz may equal 3 seconds), with cycle counts to be powers of 2. To give an example of counting matrix multiplies: if the average utilization is to be measured over a measurement time period of 1024 clocks (or 365 ns), then 100% utilization could be represented by 128 rows*1024 cycles=128K matrix multiply operations. If an instruction starts that will utilize 64 rows, then 64 matrix multiply operations can be added to the utilization accumulator on every cycle that data enters the array. In some embodiments, throttling may be considered as part of determining the array utilization. If, for example, throttler 275 is applying 50% throttling when this instruction executes, then 64 matrix multiply units will be added to the accumulator on 50% of the cycles in the measurement time period and the accumulator will total to 32K after 1024 cycles. So the average utilization for the measurement time period would be 32K/128K=25%. In some embodiments, other units of measure for time may be supported for programming the measurement time period.

In some embodiments, a hysteresis implementation may rely upon comparing an average activity for a current measurement period with the average activity for the previous measurement period to determine whether the activity was "rising" or "falling". If the activity is rising, then the current average activity would be used as the index into the "rising" portion of an action table, such as multi-level action table 840, or if the activity was falling, then the current average activity would be used as the index into the "falling" portion of the action table. The rising portion and falling portion of the action table could be programmed differently to effectivity apply some hysteresis. For example, having 50% throttling applied at >50% average activity in the "rising" portion of the action table and having 100% throttling (i.e. no throttling) at <25% average activity in the "falling" portion of the action table, provides some hysteresis in cases where the average activity rises and falls monotonically. However, it is not uncommon for the array activity to behave non-monotonically.

In some embodiments, other hysteresis determinations may be implement to handle scenarios where array behavior is non-monotonic. For example, the below action table illustrates a case where the array activity is non-monotonic and the "rising"/"falling" hysteresis does not effectively work. The action table is programmed as follows (setting throttling to start at 50% in the rising part of the table and setting throttling to end at 25% in the falling part of the table):

TABLE 1

| Rising/Falling | Average Activity | Throttling |
|---|---|---|
| Rising | 0.0% <= u < 12.5% | 100% |
| Rising | 12.5% <= u < 25.0% | 100% |
| Rising | 25.0% <= u < 37.5% | 100% |
| Rising | 37.5% <= u < 50.0% | 100% |
| Rising | 50.0% <= u < 62.5% | 50% |
| Rising | 62.5% <= u < 75.0% | 50% |
| Rising | 75.0% <= u < 87.5% | 50% |
| Rising | 87.5% <= u < 100% | 50% |
| Falling | 0.0% <= u < 12.5% | 100% |
| Falling | 12.5% <= u < 25.0% | 100% |
| Falling | 25.0% <= u < 37.5% | 50% |
| Falling | 37.5% <= u < 50.0% | 50% |
| Falling | 50.0% <= u < 62.5% | 50% |
| Falling | 62.5% <= u < 75.0% | 50% |
| Falling | 75.0% <= u < 87.5% | 50% |
| Falling | 87.5% <= u < 100% | 50% |

In an example scenario, throttling begins when the average array utilization is rising and reaches 55% which triggers 50% throttling to be applied. The throttling is maintained as the activity drops to 50% and then to 35% as the array activity decreases. But then if array activity were to increase to 38% which means the "rising" portion of the action table is used to determine the throttling, and 100% throttling (e.g., no throttling) is applied. In this case the throttling was not maintained until the activity decreased to below 25% was intended by the table programming.

To address this, in some embodiments, each hardware-based activity monitor may have a CSR which specifies the HYSTERESIS_HIGH and HYSTERESIS_LOW fields, a HYSTERESIS state bit which indicate when hysteresis is active and which selects which portion of the Action Table will be used for the Action Table lookup (e.g., where the HYSTERESIS bit replaces the rising/falling designation). At the end of each measurement period, if the HYSTERESIS bit is currently 0 and the current average activity is greater than or equal to the HYSTERESIS HIGH field, then the HYSTERESIS bit gets set to 1 and the Action Table lookup will be in the hysteresis portion of the Action Table; otherwise, the HYSTERESIS bit remains 0 and the Action Table lookup will be in the "no hysteresis" portion of the Action Table.

The below action table illustrates the same case where the array activity is non-monotonic but the hardware monitor is using this alternative hysteresis implementation. The HYSTERESIS_HIGH field is set to 50% and the HYSTERESIS LOW field is set to 25%. The HYSTERESIS bit is 0 at the start of the graph. The action table is programmed as follows (note that this example shows the Action Table in a single level action table, but a multi-level action table could alternatively be used, as discussed below):

TABLE 2

| No Hys/Hys | Average Activity | Throttling |
|---|---|---|
| No Hysteresis | 0.0% <= u < 12.5% | 100% |
| No Hysteresis | 12.5% <= u < 25.0% | 100% |
| No Hysteresis | 25.0% <= u < 37.5% | 100% |
| No Hysteresis | 37.5% <= u < 50.0% | 100% |
| No Hysteresis | 50.0% <= u < 62.5% | 50% |
| No Hysteresis | 62.5% <= u < 75.0% | 50% |
| No Hysteresis | 75.0% <= u < 87.5% | 50% |
| No Hysteresis | 87.5% <= u < 100% | 50% |
| Hysteresis | 0.0% <= u < 12.5% | 100% |
| Hysteresis | 12.5% <= u < 25.0% | 100% |
| Hysteresis | 25.0% <= u < 37.5% | 50% |
| Hysteresis | 37.5% <= u < 50.0% | 50% |
| Hysteresis | 50.0% <= u < 62.5% | 50% |
| Hysteresis | 62.5% <= u < 75.0% | 50% |
| Hysteresis | 75.0% <= u < 87.5% | 50% |
| Hysteresis | 87.5% <= u < 100% | 50% |

Consider an example when the average array utilization reaches 55%, the HYSTERESIS bit is set and 50% throttling is applied. The throttling is maintained even when the activity drops to 35% and increases back to 38% and then 50% since the HYSTERESIS bit remains set. Once the activity drops below 25%, the throttling is set to 100% (e.g., no throttling). This Hysteresis implementation will allow any amount of hysteresis to be applied to make the throttling more stable and to ensure that once throttling is triggered, the activity will not go above that throttling level until the activity drops enough for the hysteresis to be cleared.

In various embodiments, array utilization monitor 510 may utilize a single level action table. In some embodiments, array utilization monitor 510 may implement a multi-level action table, such as multi-level action table 850, to determine throttling recommendations and/or other actions based on the utilization measurements. In some embodiments, multi-level action table 850 can be programmed via CSRs 540, as discussed above with regard to FIG. 7.

When active, array utilization monitor 510 may perform a lookup into multi-level action table 850 at the end of a measurement time period. Multi-level action table lookup may be implemented as a series of three lookups in three different sub-tables. The three sub-tables are called the Activity Table, the Remapping Table, and the Throttling Table, in some embodiments. Breaking the Action Table into a series of 3 lookups has the following benefits/features:

Provides an increased activity granularity

Allows any amount of hysteresis to be applied

Allows the software-based activity monitory to dynamically adjust the throttling levels with a single CSR write while the hardware-based activity monitor is active (as discussed in detail below with regard to FIGS. 17-18)

The following is an example description of a multi-level action table. The Activity Table has 64 entries with 32 entries for the "No Hysteresis" portion and 32 entries for the "Hysteresis" portion. The table entries are 3 bits wide, so the overall table is 64×3=192 bits. The output from the Activity Sub-Table is called the Activity Sub-Table Output and it is used as an index into the Remapping Sub-Table. The Activity Sub-Table entries are written using an indirect addressing method. In some embodiments, this sub-table is normally written once at boot time and not changed dynamically.

The Remapping Sub-Table has 8 entries which are 3 bits wide, so the overall table is 8×3=24 bits. The output from the Remapping Sub-Table is called the Remapping Table Output and it is used as an index into the Throttling Sub-Table. The Remapping Sub-Table is memory mapped as a single CSR with eight 3-bit wide fields, so that the software-based activity monitor or microcontroller can quickly and dynamically change the throttling by re-writing the entire remapping sub-table with a single CSR write.

The Throttling Sub-Table has 8 entries which are 26-bit wide. The table entry contains k, n, k_div_n, interrupt enable, notification enable. The output from the Throttling Sub-Table is called the Throttling Table Output and it is fed into the Action Arbiter. This sub-table is normally written once at boot time and not changed dynamically.

As indicated at 840, an action table index computation may be performed in order to determine the corresponding entry in the action table to use for the throttling recommendation or other actions. For instance, in view of the example multi-level action table given above, at the end of a measurement period, the hardware-based activity monitor determines the current average activity, updates the HYSTERESIS bit, and then does an Action Sub-Table lookup. Action table index computation 840 starts with the 5-bit current average activity and the 1-bit HYSTERESIS bit as the index into the Activity Sub-Table on the first cycle. On the second cycle, the 3-bit Activity Sub-Table Output is used as the index into the Remapping Sub-Table. On the third cycle, the 3-bit Remapping Sub-Table Output is used as the index into the Throttling Sub-Table. On the fourth cycle, the Throttling Sub-Table output contains the fields that are fed to the Action Arbiter.

Below is an example of a multi-level action table 850. Note that not all entries are shown for simplicity. The tables are configured to start throttling if the activity goes above 44.75% and throttle at apply throttling at 44.75% (K/N=14/32) and maintain throttling at that level using the hysteresis until the activity goes below 25%. Initially, the remapping table is programmed to map 0 to 0, 1 to 1, etc. Below is an example of the Action Sub-Table:

TABLE 3

| Hysteresis | Activity | Activity Table Output |
|---|---|---|
| 0 | 0.0% <= u < 3.125% | 0 |
| 0 | . . . | 0 |
| 0 | 41.625% <= u < 44.75% | 0 |
| 0 | 44.75% <= u < 47.875% | 2 |
| 0 | . . . | 2 |
| 0 | 96.875% <= u < 100.0% | 2 |
| 1 | 0.0% <= u < 3.125% | 0 |
| 1 | . . . | 0 |
| 1 | 21.875% <= u < 25.0% | 0 |
| 1 | 25.0% <= u < 28.125% | 2 |
| 1 | . . . | 2 |
| 1 | 96.875% <= u < 100.0% | 2 |

Below is an example of a remapping sub-table:

TABLE 4

| Index | Remapping Table Output |
|---|---|
| 0 | 0 |
| 1 | 1 |
| 2 | 2 |
| 3 | 3 |

Below is an example of a throttling sub-table:

TABLE 5

| Index | K | N | K_DIV_N | NOTIF_EN | INT_EN | Note |
|---|---|---|---|---|---|---|
| 0 | 32 | 32 | 0xFF | 0 | 0 | No Throttling |
| 1 | 8 | 32 | 0x3F | 0 | 0 | 25% Throttling |
| 2 | 14 | 32 | 0x6F | 0 | 0 | 44.75% Throttling |
| 3 | 24 | 32 | 0xBF | 0 | 0 | 75% Throttling |

As discussed below with regard to FIGS. 17 and 18, fast throttling criteria modification may be performed by a single write to the remapping table. During operation the software-based activity monitor is monitoring temperatures across the whole die and the average activity levels measured by the hardware-based activity monitors for each tensor processing unit. By using the Remapping Sub-Table, the software-based activity monitor can use its global view to quickly adjust throttling in all of the systolic arrays to optimize performance by better sharing the power/heat usage.

For example, if the software-based activity monitor sees that Systolic Array0 is extremely active and being throttled, while a Systolic Array 1 has very low utilization and no throttling occurring, and the overall temperature of the die is not very high, the software-based activity monitor can write to the Remapping Sub-Table CSR for the hardware-based activity monitor in Systolic Array 0 to reduce the amount of throttling, and write to the Remapping Sub-Table CSRs for the hardware-based activity monitors in Systolic Array 1 to increase the amount of throttling to offset (even through Array 1 has very low utilization and will not be throttled at this level).

To implement this, the Systolic Array 0 Remapping Sub-Table CSR will be updated as below to apply 75% throttling instead of 44.75%:

TABLE 6

| Index | Remapping Table Output |
|---|---|
| 0 | 0 |
| 1 | 1 |
| 2 | 3 |
| 3 | 3 |

The Systolic Array 1 Remapping Sub-Table CSR will be updated as below to apply 25% throttling instead of 44.75%:

TABLE 7

| Index | Remapping Table Output |
|---|---|
| 0 | 0 |
| 1 | 1 |
| 2 | 1 |
| 3 | 3 |

As discussed above with regard to FIG. 5, row activity monitors 522 may be implemented to analyze activity data on respective rows. FIG. 9 is a logical block diagram illustrating data activity detection, according to some embodiments. Activity detection 523 may be implemented to monitor changes to input data on a row, in various embodiments. For example, individual bits of a data payload received on an x-direction bus, such as x-bus data payload bit 910*a*, 910*b*, 910*c*, and so on, may be processed through respective flip flops 920*a*, 920*b*, 920*c* and XORs 922*a*, 922*b*, and 922*c* to determine if a data is changing. In this way, a prior x-bus data bit (as output by a flip flop 920) may be XOR'd with a current x-bus data payload bit to determine if the data is changing. In this way, flip flops 920 and XORs 922 may act as a pipeline stage in the x-direction bus path into the array. In some embodiments, data activity monitoring may look at data payload without looking at x-direction control bits (which may not change that much). In some embodiments, the data XORing at 922 may be done on the left edge of the systolic array for the payload bits of each x-direction bus (such as in the preprocessing logic). For 5 x-direction buses, for example, there will be 5 x-direction buses multiplied by 22 payload bits=110 XOR gates per row.

The type of change (e.g., between "0" and "1") may be indicative of the current draw, in some embodiments. A count of the number x-direction bus payload bits that transition in the same direction may be indicative of current draw (e.g., the worst current draw), in some embodiments. While it might be expected that the largest current draw may occur when more bits flip from low-to-high and the largest current sink when more bits flip from high to low. Therefore, it may be beneficial to be able to configure the edge detector 930 to count specific data transitions (as opposed to all data transitions), in some embodiments. In this way, it may be possible to count high-to-low transitions, low-to-high transitions, or a transition in either direction. Which transitions are detected may be configured, as indicated at 932, in some embodiments, via CSRs 540, as discussed above with regard to FIG. 5.

As illustrated in FIG. 9, edge detectors, such as edge detectors 930*a*, 930*b*, and 930*c* may be able to determine the type of changes, as discussed above. For example, edge detectors 930 may take as input the XOR 922 output and current state form flip flop 920 to determine the type of transition. In some embodiments, an edge detector may use a register stage according to the timing of x-direction bus in. Below is example table of mapping respective inputs to edge detector 930 outputs.

TABLE 8

| Edge Detector Inputs | | | |
| --- | --- | --- | --- |
| Edge Config | Current xbus bit State | Data XOR State (Current xbus bit xor New xbus bit) | Edge Detector Output |
| Rising | 0 | 1 | 1 |
| Rising | 1 | 1 | 0 |
| Falling | 0 | 1 | 0 |
| Falling | 1 | 1 | 1 |
| Rising or Falling | 0 | 1 | 1 |
| Rising or Falling | 1 | 1 | 1 |
| X | X | 0 | 0 |

Activity detection 940 may implement x-bus data transition counter 940, in some embodiments, which may count the edge detector 930 outputs, which indicate the number of x-direction bits that are transitioning, as indicated at 942. In some embodiments, the aggregation of edge detector 930 outputs can be grouped in various ways in order to meet timing.

FIG. 10 is a logical block diagram illustrating an example of data activity aggregation, according to some embodiments. As illustrated in FIG. 10, row data transitions from different x-buses for a row, such as row data transitions 1012*a*, 1012*b*, through 1012*n*, may then be combined (e.g., through one or more adder(s) 1010, which may be arranged in an adder tree). The combined transitions may then be compared with row against a row activity threshold, as indicated at 1020. For example, the combined count may be compared against a programmable row activity threshold, as indicated at 1022 and discussed above with regard to FIG. 5, and a single "Row Above Threshold" signal may be output, as indicated at 1024, to indicate if the number of transitions is above or below the threshold on each cycle, in some embodiments. The row activity threshold can be configured for all rows based on a single CSR 340, in some embodiments. In some embodiments, the row activity threshold may correspond to match a number of x-direction bus payload bits.

For example, it may be the case that 50% of the bits transitioning or 25% of the bits transitioning (sometimes described as "toggling") in the same direction (which may happen with random data) and may be considered "normal." The Row Activity Threshold may be set to be at these levels such that it could be expected that half the rows being above this threshold is normal. In some embodiments, multiple thresholds may be implemented to indicate different levels of activity by comparing the combined data transitions count with the different levels.

FIG. 11 is a logical block diagram illustrating an example array data activity monitor, according to some embodiments. In various embodiments, the individual row above threshold indications, as indicated 1112*a*, 1112*b*, through 1112*n* may be counted at respective row-level counters 1110*a*, 1110*b*, through 1110*n*. One or more adders 1120 may be used to combine the individual row-level counts into a single array level count, in some embodiments.

In some embodiments, array data activity may be determined by adding the single array level count to an accumulator, such as accumulator 1130, for every cycle. In some embodiments, array data activity may be a measurement over a period of time. As indicated at 1132, a current accumulation (or an accumulation as the array data activity measurement upon which a throttling recommendation is made) may be reported back by updating CSRs 540, as indicated at 1132.

As noted above, in some embodiments, array data activity may be measured over a period of time. Array data activity monitor 520 may implement measurement period controller 1160 in order to implement a measurement time period. For example, configuration information (e.g., which may be obtained or programmed through CSRs 540) may allow for monitoring as a whole to be enabled or disabled, as indicated at 1162 and a period of time to be set, as indicated at period configuration 1164. Measurement controller 1160 may clear accumulator 1130 when a measurement period is complete and may enable or disable action table lookups to enable or disable recommending throttling action(s) 1152. In at least some embodiments, the measurement period may be programmable and support measurement time periods on the order of seconds (e.g., a 33-bit counter to allow 233/2.8 GHz may equal 3 seconds) and with cycle counts to be powers of 2.

In various embodiments, array data activity monitor 520 may utilize an action table, such as action table 1150, to determine throttling recommendations and/or other actions based on the data activity measurements. In some embodiments, action table 1150 can be programmed via CSRs 540, as discussed above with regard to FIG. 7. When active, array data activity monitor 320 may perform a lookup into action table 1150 at the end of a measurement time period. As indicated at 1140, an action table index computation may be performed in order to determine the corresponding entry in the action table to use for the throttling recommendation or other actions. In some embodiments, the index into the table may be broken into two fields. Similar to the discussion above with regard to FIG. 10, the action table may be a multi-level action table. For example, at the end of a measurement period action table index computation 1140 determines the current average activity, updates the HYS-TERESIS bit, and then does an Action Sub-Table lookup. Action table index computation 1140 starts with the 5-bit current average activity and the 1-bit HYSTERESIS bit as the index into the Activity Sub-Table on the first cycle. On the second cycle, the 3-bit Activity Sub-Table Output is used as the index into the Remapping Sub-Table. On the third cycle, the 3-bit Remapping Sub-Table Output is used as the index into the Throttling Sub-Table. On the fourth cycle, the Throttling Sub-Table output contains the fields that are fed to the Action Arbiter.

In some embodiments, throttling sub-table 1150 may include entries that contain k and n values and a numerical representation of the throttling percentage (k/n). In some embodiments, a power management component (e.g., a microcontroller executing firmware) may populate the table with these values (e.g., the hardware will not compute the numerical representation of k/n). In some embodiments, action table 1150 may also include a flag to indicate when an interrupt should be generated and sent. In some embodiments, the numerical representation of k/n may be used to arbitrate between the throttling recommendations from multiple monitors (e.g., with the most severe/lowest throttling percentage winning) by arbiter 530. Then, the k and n values from the winning monitor may be used by throttler 275 to control the throttling.

Below is an example of a multi-level action table 1150, including multiple sub-tables. Although examples given below are similar to the sub-tables described above with regard to FIG. 8, in some embodiments, values that differ from the multi-level action table for array utilization monitor may be used in other embodiments. Below is an example of the Action Sub-Table:

TABLE 9

| Hysteresis | Activity | Activity Table Output |
|---|---|---|
| 0 | 0.0% <= u < 3.125% | 0 |
| 0 | . . . | 0 |
| 0 | 41.625% <= u < 44.75% | 0 |
| 0 | 44.75% <= u < 47.875% | 2 |
| 0 | . . . | 2 |
| 0 | 96.875% <= u < 100.0% | 2 |
| 1 | 0.0% <= u < 3.125% | 0 |
| 1 | . . . | 0 |
| 1 | 21.875% <= u < 25.0% | 0 |
| 1 | 25.0% <= u < 28.125% | 2 |
| 1 | . . . | 2 |
| 1 | 96.875% <= u < 100.0% | 2 |

Below is an example of a remapping sub-table:

TABLE 10

| Index | Remapping Table Output |
|---|---|
| 0 | 0 |
| 1 | 1 |
| 2 | 2 |
| 3 | 3 |

Below is an example of a throttling sub-table:

TABLE 11

| Index | K | N | K_DIV_N | NOTIF_EN | INT_EN | Note |
|---|---|---|---|---|---|---|
| 0 | 32 | 32 | 0xFF | 0 | 0 | No Throttling |
| 1 | 8 | 32 | 0x3F | 0 | 0 | 25% Throttling |
| 2 | 14 | 32 | 0x6F | 0 | 0 | 44.75% Throttling |
| 3 | 24 | 32 | 0xBF | 0 | 0 | 75% Throttling |

Figure 12:
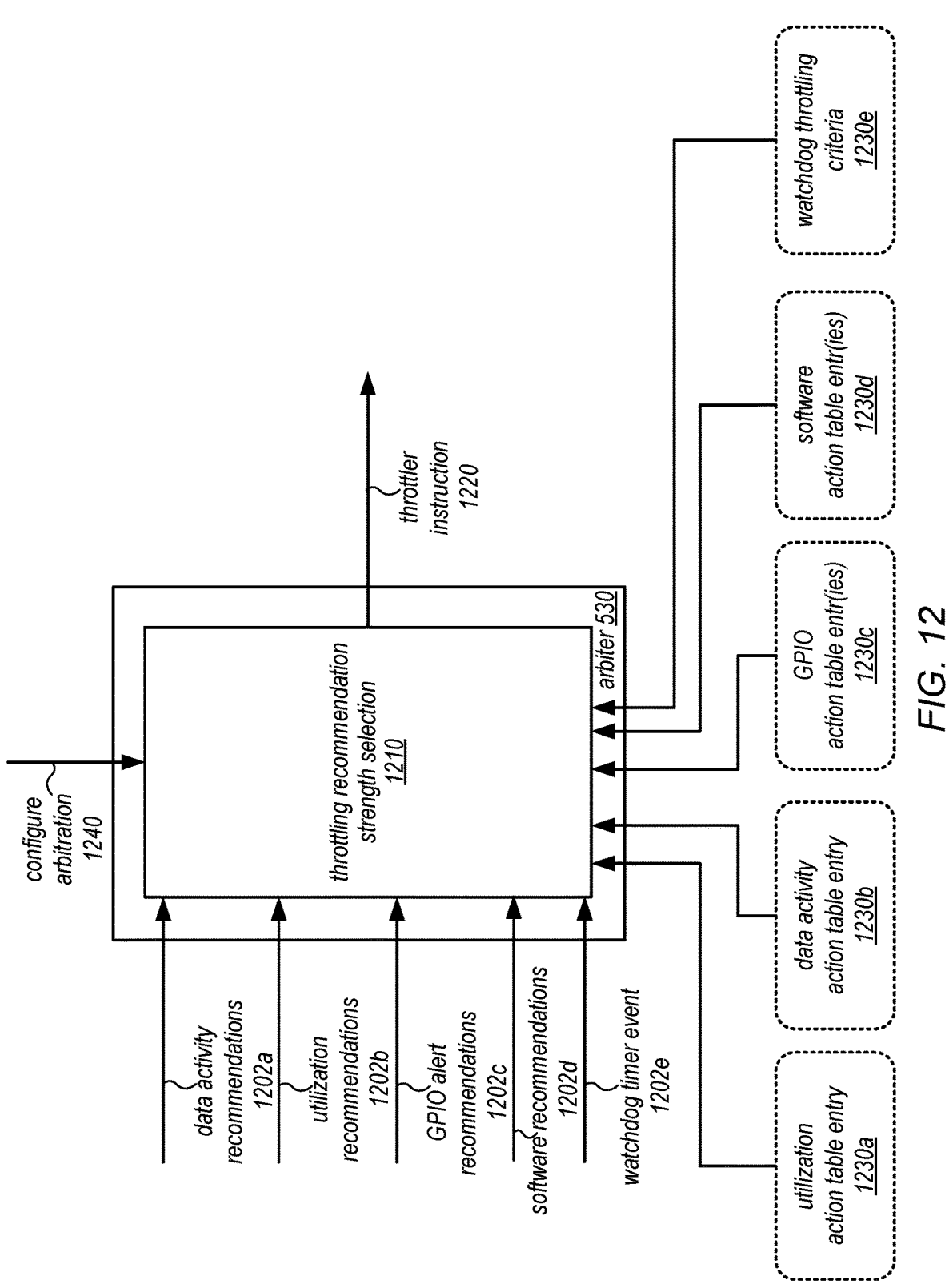
FIG. 12 is a logical block diagram illustrating an arbiter, according to some embodiments.

FIG. 12 is a logical block diagram illustrating an arbiter, according to some embodiments. Arbiter 530 may receive throttling recommendations from various sources. For example, data activity recommendations 1202a may be received from array data activity monitor 520, in some embodiments, based on array data activity measurements of the changes in input data to the systolic array. The number of data transitions between payload bits received in an x-direction bus may be determined, for instance, and compared with an array activity threshold to indicate those arrays with a higher than expected amount of data activity, resulting in a throttling recommendation.

Similarly, utilization recommendations 1202b may be received that are determined by array utilization monitor(s) 510. Array utilization monitor(s) 510 may measure the number of operations (e.g., matrix multiply operations) in instructions to processing elements (e.g., at various rows) in order to determine respective utilization numbers for different processing cycles.

Some recommendations may not be generated by monitors, but instead from external sources. For example, GPIO alert recommendations 1202c may triggered based on other sensor readings (e.g., with respect to a voltage regulator) or directly by software-based activity monitor implemented on another die. In this way, arbiter 530 may support other scenarios where hardware can detect conditions from the sensor readings to bypass software-based power management (e.g., a microcontroller) in order to quickly trigger throttling. Different types of GPIO alert recommendations 1202c may be supported from different sources (e.g., from different sensors or other hardware components that may monitor for specific events). Similarly, CSRs 540 can be used to provide software recommendations 1202d, which may allow power management 212, or other software-based controls (e.g., a software-based activity monitor) to make throttling recommendations to a hardware-based arbiter like arbiter 530.

In at least some embodiments, the throttling criteria, which may specify the amount of throttling (as well as any other responsive actions, including reporting various statistics or information about throttler instruction 1220 via notification channels or interrupts) may be obtained from an action table, as discussed above. An action table may include one or multiple entries that may include, among other information, how much to throttle (e.g., as specified according to k and n values). Various monitors make recommendations obtained from entries in action tables, such as utilization action table entry 1230a and data activity table entry 1230b. In some embodiments, action tables may also provide entries for externally sourced recommendations, so that the throttling recommendations may be pre-defined, such as GPIO action table entry 1230c and software action table entry 1230d. In some embodiments, throttling criteria may be stored in CSRs or other storage components, such as watchdog throttling criteria 1230 which may be used to define the throttling criteria to apply when a watchdog timer is not reset.

In various embodiments, arbiter 530 may implement one or multiple components to implement throttling recommendation strength selection 1210. Throttling recommendation strength selection 1210 may implement a technique to select from the received recommendations a strongest throttling recommendation to send as instruction 1220. For example, various throttling recommendations may indicate various throttling strengths (e.g., represented as numeric values or percentages as described above with regard to FIG. 5). Throttling recommendation strength selection 1210 may then compare these throttling strengths to identify a highest or lowest value according to the way in which strength is specified. As different recommendations may arrive at different times, selection by throttling recommendations strength selection 1210 may be triggered or performed in response to receiving another throttling recommendation. For example, a measurement period for an activity monitor may end, causing a new throttling recommendation to be made to arbiter 530. In some scenarios, the throttling recommendation made by a source may not change, but the evaluation may still be performed.

As indicated at 1240, arbiter 530 may support changes in configuration (e.g., received via CSRs 540). For example, arbitration configuration 1240 may mask or exclude some recommendation sources from consideration (e.g., from one or more utilization monitors, data activity monitors, etc.), even if those sources may recommend the strongest throttling.

The examples of a various monitoring techniques discussed above have been given in regard to an example machine learning accelerator. Note that various other types or configurations of integrated circuits may implement the above techniques. In addition to examples given above, the techniques discussed below with regard to FIGS. 13-21 may be also implemented using the various components discussed above as well as different types of systems or devices that implement an integrated circuit.

FIG. 13 is a high-level flowchart illustrating various methods and techniques to implement on-chip software-based activity monitor to configure throttling at a hardware-based activity monitor, according to some embodiments. As indicated at 1310, a software-based activity monitor of an integrated circuit may monitor data obtained from one or more components of the integrated circuit, in some embodiments. As discussed above with regard to FIG. 1, the software-based activity monitor may be implemented on a dedicated processor for the software-based activity monitor that executes programming instructions, such as firmware to implement the software-based activity monitor. Sources of data obtained from a component of the integrated circuit may include on-chip sensors, such as temperature or power (e.g., voltage) sensors. Other sources may include one (or more) hardware-based activity monitors. In addition to on-chip sensors, the software-based activity monitor may obtain data from off-chip components. For example, data may be obtained from sensors that determine temperature or power measurements (e.g., power readings obtained from a voltage regular as depicted in FIG. 3 above). In some embodiments, data may be obtained from other software-based activity monitors implemented for different integrated circuits sharing a common substrate, as discussed above with regard to FIGS. 3 and 4A, and/or hardware-based activity monitors for the other integrated circuit.

In at least some embodiments, the monitoring performed by the software-based activity monitor may be implemented as a control loop. One example of such a control loop may collect data by reading hardware-based activity monitor average utilization and average throttling from each processing engine associated on the integrated circuit, such as the tensor processing units 270 discussed above with regard to FIG. 2, reading on-chip and off-chip temperature sensors, reading on-board power sensors, reading GPIOs indicating the state of other integrated circuits, reading process detectors for leakage estimation based on temperature. As part of the control loop, the software-based activity monitor may estimate the chip power and thermals and provide throttling recommendations to each hardware-based activity monitor by modifying throttling criteria based on power and thermal estimates, in some embodiments. Additional features for multi-chip modules and/or integrated circuits may be implemented as part of the control loop, such as providing a centralized trigger for synchronizing measurement periods of hardware-based activity monitors, as discussed above with regard to FIG. 4B, write GPIOs (or other communication interfaces) to indicate a current state to software-based activity monitors implemented on another die, and/or write to a watchdog time to indicate that the software-based activity monitor is active.

As indicated at 1320, a modification to throttling criteria used by a hardware-based activity monitor implemented on a second portion of the integrated circuit may or may not be determined, in some embodiments. The throttling criteria may be used to evaluate processing performed on a third portion of the integrated circuit in order to apply throttling to the rate at which data enters the third portion (e.g., a systolic array). For example, the software-based activity monitor may apply or change the throttling criteria to decrease throttling in one or more hardware-based activity monitors to immediately lower the temperature or power, adjust the remapping sub-tables to allow one processing engine to temporarily operate at higher activity rates while throttling others processing engines more (sharing the power), or assert a THROTTLE_OUT GPIO to trigger fixed throttling on another integrated circuit.

As indicated at 1330, the software-based activity monitor may apply the modification to the throttling criteria used by the hardware-based activity monitor, in some embodiments. For example, a write to a CSR or other storage component to change action table entries (e.g., either in a single level action table or in a multi-level action table as discussed above with regard to FIGS. 8 and 11 and below with regard to FIGS. 19 through 21). Note that multiple hardware-based activity monitors may be implemented on the integrated circuit, in some embodiments, and thus the software-based activity monitor may be able to perform the techniques discussed above with regard to FIG. 13 for each hardware-based activity monitor to make adjustments to the throttling criteria that is applied by those hardware-based activity monitors.

Figure 14:
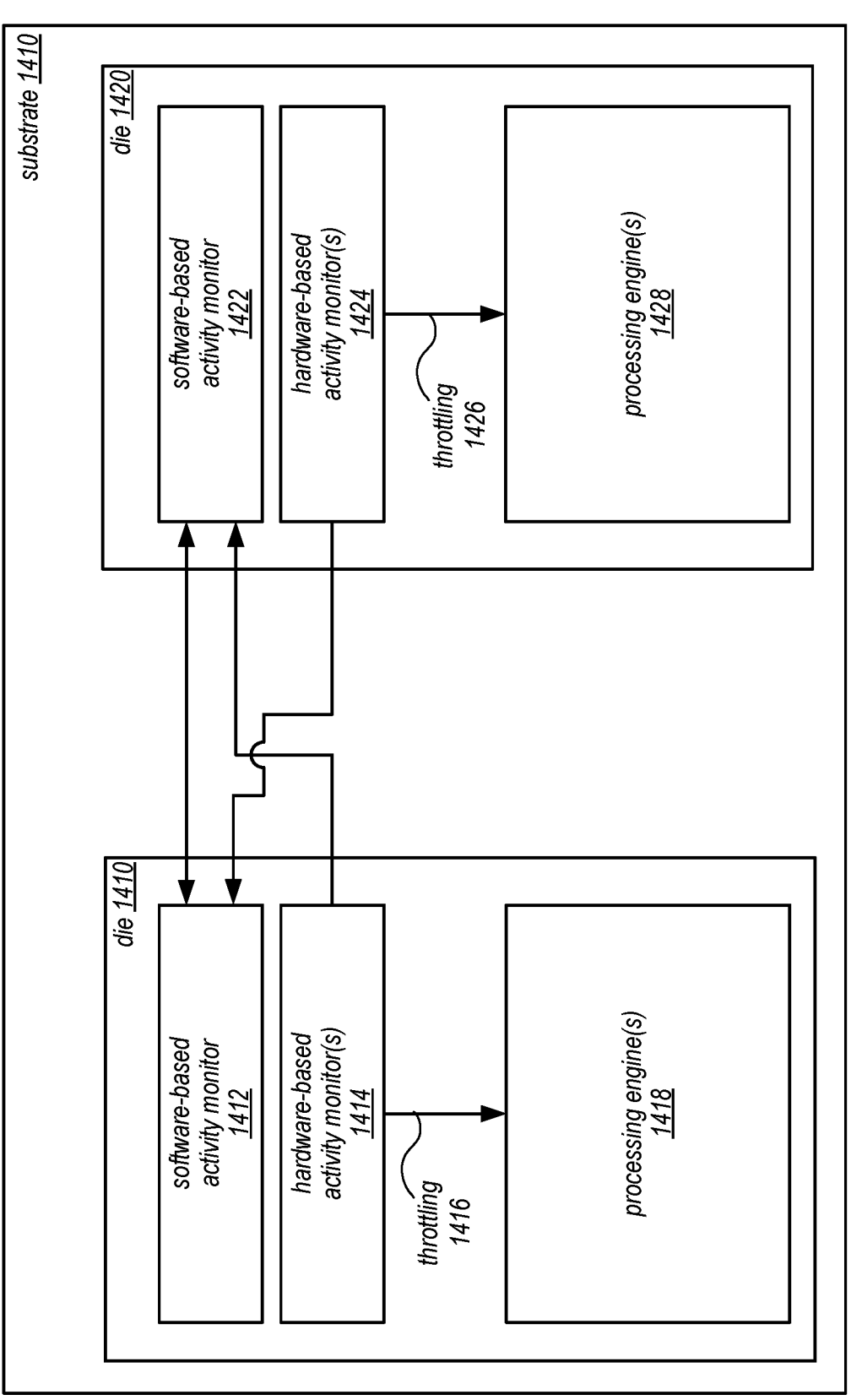
FIG. 14 illustrates a logical block diagram illustrating cross-chip throttling management for multi-chip devices, according to some embodiments.

Although the examples discussed above with regard to machine learning inference accelerator implement cross-chip throttling management techniques, cross-chip throttling management techniques may be applicable to other devices. Therefore, FIG. 14 illustrates a logical block diagram illustrating cross-chip throttling management for multi-chip devices, according to some embodiments, which may perform different operations than those related to machine learning inference acceleration. For example, die(s) 1410 and 1420 may be separate integrated circuits that implement one or more processing engine(s) 1418 (e.g., systolic arrays, general purpose processors, graphics processors, or various other processor types). As illustrated in FIG. 14, corresponding to each processing engine 1418 may be a respective hardware-based activity monitor 1414 and 1424, which may perform various actions to monitor for and respectively throttle 1416 and 1436 processing engine(s) 1418 and 1428 according to techniques similar to those discussed above with regard to FIGS. 5-12. Die(s) 1410 may be mounted on, coupled to, or otherwise integrated as part of a larger substrate 1410 (e.g., for a card, board, or other device).

Like the techniques discussed above with regard to FIGS. 1, 3-4B, and 13, software-based activity monitors may be implemented for each die, such as software-based activity monitors 1412 and 1422. These software-based activity monitors 1412 and 1422 may perform various data collection and throttling management or control actions with respect to their hardware-based activity monitor(s) 1414 and 1424. Additionally, software-based activity monitors may communicate with one another to, for example, handle scenarios where one software-based activity monitor may be down, offline or otherwise unavailable to perform software-based activity monitoring. A toggling signal or other liveness indication may be exchanged between software-based activity monitors 1412 and 1422. In some embodiments, other data descriptive of the performance of throttling on the other die may be exchanged (e.g., power information, throttling state, etc.).

As illustrated in FIG. 14, instructions may be sent from software-based activity monitors to hardware-based activity monitors on other dies. For instance, software-based activity monitor 1412 on die 1410 may send throttling instructions to hardware-based activity monitor(s) 1424 on die 1420. For example, in response to detecting that software-based activity monitor 1422 is not live, software-based activity monitor 1412 may act as a remote software-based activity monitor for die 1420 (e.g., to facilitate firmware updates, handle failure scenarios, or otherwise provide increased availability of software-based activity monitoring and throttling management on a device). As discussed above with regard to FIGS. 3 and 4A, different interfaces or other communication signals may be used, such as GPIO pins, GPIO controllers, and an APB interface to write to or read from GPIO controllers.

FIG. 15 is a high-level flowchart illustrating various methods and techniques to implement cross-chip throttling management for multi-chip devices, according to some embodiments. As indicated at 1510, a first software-based activity monitor of a first integrated circuit may receive data from a second software-based activity monitor of a second integrated circuit. For example, the second software-based activity monitor may provide a liveness signal by toggling a value. Other information, such as various state or power measurements may be provided.

As indicated at 1520, the first software-based activity monitor of the first integrated circuit may determine a modification to throttling to be performed by a hardware-based activity monitor implemented on the second integrated circuit, in some embodiments. For example, after detecting a first toggle (as part of the received data at 1510), a second liveness toggle from the second software-based activity monitor may not be received (e.g., after waiting a period of time). Thus, a determination may be made to begin throttling control actions by the first software-based activity monitor on the second integrated circuit (e.g., increasing throttling). In some embodiments, the received data may be power measurements or other information about the state of throttling at the second integrated circuit. Thus, the determination may be made to recommend or instruct more (or less throttling), as the first integrated circuit may have different power usage.

As indicated at 1530, the modification may be sent to the hardware-based activity monitor of the second integrated circuit, in some embodiments. For example, a write to a CSR of the hardware-based activity monitor may be made to modify throttling criteria (e.g., in an action table or other storage location that stores information used to apply throttling). In another example, the modification may be sent using communication lines like GPIO, which may allow the software-based activity monitor to directly instruct throttling on the hardware-based activity monitor on the other integrated circuit. As noted earlier, multiple hardware-based monitors and processing engines may be implemented on an integrated circuit and thus the determination of modifications and sending of modifications may be made with respect to multiple hardware-based activity monitors on the other integrated circuit.

Because a software-based activity monitor can obtain data from off-chip (e.g., from off-chip sensors and other software-based activity monitors on other integrated circuits), a software-based activity monitor can make local throttling management actions using a global view of the data obtained from additional, external sources. FIG. 16 is a high-level flowchart illustrating various methods and techniques to implement using cross-chip data to perform on-chip throttling management, according to some embodiments. As indicated at 1610, a first software-based activity monitor of a first integrated circuit may receive data from a second software-based activity monitor of a second integrated circuit. For example, various state or power measurements may be provided.

As indicated at 1620, the first software-based activity monitor of the first integrated circuit may determine a modification to throttling to be performed by a hardware-based activity monitor implemented on the first integrated circuit, in some embodiments based on the received data. For example, the received data may be power measurements or other information about the state of throttling at the second integrated circuit. Thus, the determination may be made to recommend or instruct less, as the second integrated circuit may be under a heavy workload.

As indicated at 1630, the modification may be sent to the hardware-based activity monitor of the first integrated circuit, in some embodiments. For example, a write to a CSR of the hardware-based activity monitor may be made to modify throttling criteria (e.g., in an action table or other storage location that stores information used to apply throttling). In another example, the modification may be sent using communication lines like GPIO, which may allow the software-based activity monitor to directly instruct throttling on the hardware-based activity monitor. As noted earlier, multiple hardware-based monitors and processing engines may be implemented on an integrated circuit and thus the determination of modifications and sending of modifications may be made with respect to multiple hardware-based activity monitors on the integrated circuit.

Figure 17:
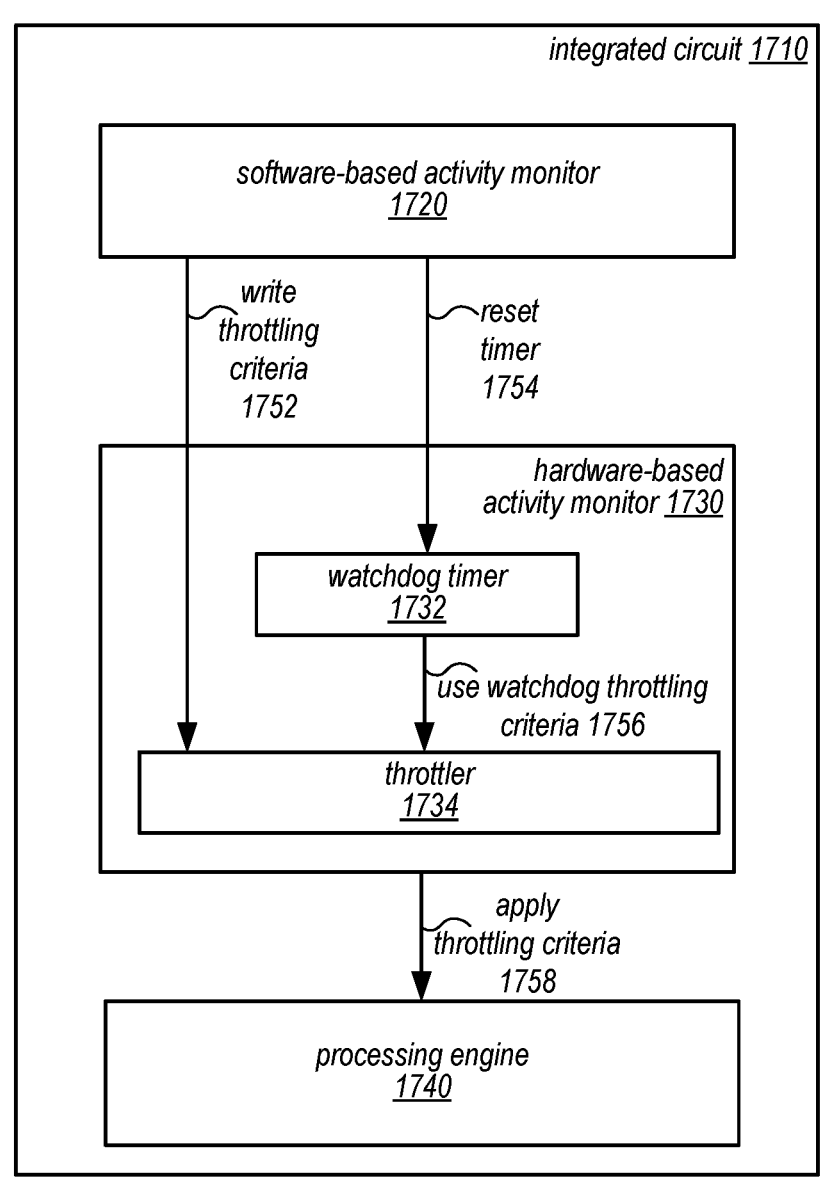
FIG. 17 illustrates a logical block diagram illustrating a watchdog timer for detecting liveness of a software-based activity monitor that configures the throttling of the hardware-based activity monitor, according to some embodiments.

FIG. 17 illustrates a logical block diagram illustrating a watchdog timer for detecting liveness of a software-based activity monitor that configures the throttling of the hardware-based activity monitor, according to some embodiments. Integrated circuit 1710 may implement a software-based activity monitor 1720 which may implement various throttling management techniques with respect to a hardware-based activity monitor 1730, in some embodiments, as discussed above with regard to FIGS. 1, 3-5, and 13-16, such as writing throttling criteria 152 to be applied by a throttler 1734, as indicated at 1758 to a processing engine 1740 (e.g., a systolic array, general purpose processor, graphics processor, or other processer).

In order to prevent a failure of software-based activity monitor 1720 from disrupting or stopping the throttling of hardware-based activity monitor 1730, hardware-based activity monitor 1730 may implement watchdog timer 1732. Watchdog timer 1732 may be used to detect liveness of software-based activity monitor 1720. Software-based activity monitor 1720 may write to watchdog timer 1732 to reset the timer, as indicated at 1754 at a time interval so that if the watchdog timer 1732 is not reset after the time interval is exceeded since a last reset, the unavailability of software-based activity monitor 1720 may be detected. The detection of no reset for the watchdog timer, may cause the watch dog timer to instruct the throttler 1734 to use watchdog throttling criteria 1756 (instead of throttling criteria found, for example, in an action table lookup). In this way, hardware-based activity monitor 1730 may continue to apply throttling criteria 1758 (including throttling criteria for a period of time in which software-based activity monitor is unavailable) in order to keep the throttling feature alive for integrated circuit 1710. Other responsive actions, in addition to (or instead of) causing the use of watchdog throttling criteria may be performed, as discussed in detail below.

FIG. 18 is a high-level flowchart illustrating various methods and techniques to implement a watchdog timer for detecting liveness of a software-based activity monitor that configures the throttling of the hardware-based activity monitor, according to some embodiments. As indicated at 1810, a hardware-based activity monitor of an integrated circuit may monitor a watchdog timer, in some embodiments. For example, a counter value may increment each clock cycle. As indicated at 1820, the monitoring may detect whether the watchdog time is reset by a software-based activity monitor of the integrated circuit within a period of time, in some embodiments. For example, the software-based activity monitor may overwrite the counter value to reset it to "0." If reset, then monitoring may continue, as indicated by the positive exit from 1820.

If not reset, then as indicated at 1830, the hardware-based activity monitor may use watchdog throttling criteria to evaluate processing performed on the integrated circuit and to modify, according to the evaluation a rate at which data enters the processing engine of the integrated circuit, in some embodiments. For example, as discussed above with regard to FIG. 6, throttling may be implemented by inserting bubbles or no-ops into the processing engine for a number of cycles out of a total number of cycles. The watchdog throttling criteria may be stored in a CSR or other storage component, which may be accessed by the hardware-based activity monitor and applied. The watchdog throttling criteria may be stored or written to the storage component upon initialization or boot of the integrated circuit or updated by the software-based throttling activity monitor or a microcontroller for a device that includes the integrated circuit (e.g., microcontroller 270 in FIG. 2).

In addition to (or instead of) applying watching throttling criteria, other responsive actions after the detection of a failure to reset the watchdog timer may be performed. These responsive actions may be enabled (or disabled) based on a watchdog timer configuration, such as one or more CSR bits corresponding to different For example, as indicated by the dotted line to 1840, an interrupt may be sent to a microcontroller for the integrated circuit indicating that the watchdog timer has not been reset, in some embodiments. In this way, a microcontroller may take corrective actions to restart or reset the software-based activity monitor on the integrated circuit. As indicated by the dotted line to 1850, a notification may be sent that the watchdog time has not been sent along with metadata for the reset failure event, in some embodiments. For example, the metadata may be indicative of the particular hardware-based activity monitor that detected, software-based activity monitor that failed to write, or various other information that may be used as part of handling the reset failure event.

In various embodiments, the watchdog timer may be configured using one or more configuration values written to a storage component implemented as part of the hardware-based activity monitor. For example, a CSR may be implemented that includes:

Watchdog Enable

Watchdog Period (e.g., period of time in which a reset may need to be performed, such as from 1 microsecond to 1 second)

Watchdog Interrupt Enable

Watchdog Notification Enable

Watchdog Notification Metadata

Watchdog Throttling K

Watchdog Throttling N

Watchdog Throttling k_div_n

Figure 19:
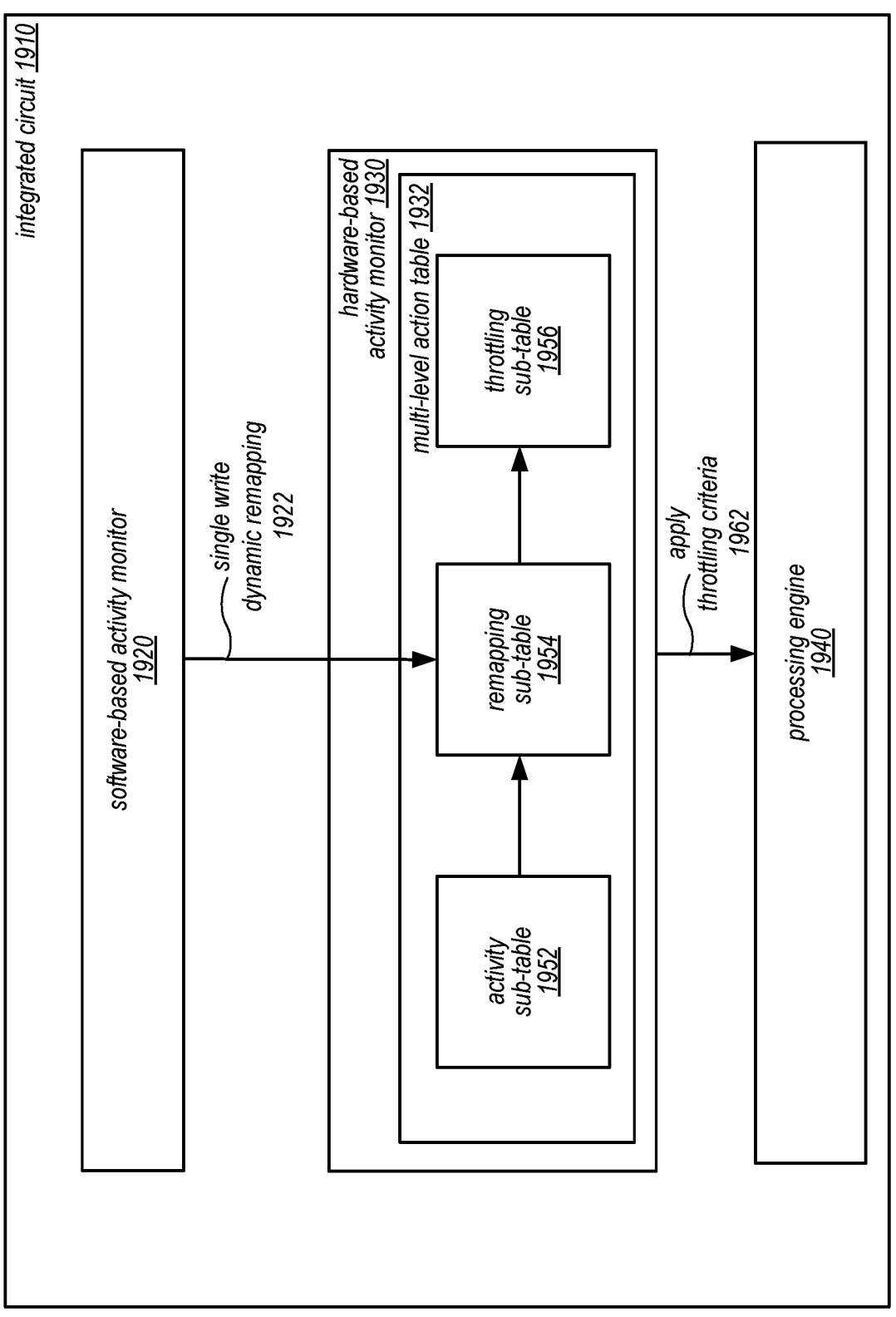
FIG. 19 is a logical block diagram illustrating a multi-level action table for dynamic remapping of throttling criteria at a hardware-based activity monitor, according to some embodiments.

Watchdog bit added to the Arbitration Winner CSR, so that the watchdog timer throttling criteria will be selected by an arbiter, like arbiter 530, as the throttling criteria to apply FIG. 19 is a logical block diagram illustrating a multi-level action table for dynamic remapping of throttling criteria at a hardware-based activity monitor, according to some embodiments. Integrated circuit 1910 may implement a software-based activity monitor 1920 which may implement various throttling management techniques with respect to a hardware-based activity monitor 1930, in some embodiments, as discussed above with regard to FIGS. 1, 3-5, and 13-18, such as writing throttling criteria to be applied by a throttler, as indicated at 1962 to a processing engine 1940 (e.g., a systolic array, general purpose processor, graphics processor, or other processer).

A multi-level action table, like multi-level action table 1932 may include multiple sub-tables which support finer throttling criteria granularities and a greater number of entries without actually making the multi-level action table larger, as well as supporting dynamic remapping that can be performed while hardware-based activity monitor 1930 can still perform activity monitoring and throttling. For example, a remapping sub-table 1954, which may be used to determine which entry in throttling sub-table 1956 to apply, can be sized so that the entire remapping sub-table can be rewritten in a single write (e.g., the number of bits in the write is large enough to write each entry but small enough that more than one write does not have to be performed).

As discussed in detail above with regard to FIGS. 8 and 11, hysteresis may be implemented as part of activity sub-table lookups 1952, which may account for non-monotonic workloads of processing engine 1940. For example, a hysteresis bit may be used to indicate high or low hysteresis levels, which may change which entries are used in activity sub-table 1952. As indicated by the arrows, three lookups may be performed, an activity sub-table 1952 lookup, the output of the found entry may then point to the entry in the remapping sub-table 1954, which may then point to the entry of the throttling sub-table 1956.

FIG. 20 is a high-level flowchart illustrating dynamic remapping for a multi-level action table for throttling criteria at a hardware-based activity monitor, according to some embodiments. As indicated at 2010, a software-based activity monitor implemented according to program instructions executing on a first portion of an integrated circuit, may determine an update to throttling criteria to be applied by a hardware-based activity monitor implemented on a second portion of the integrated circuit. For example, as part of a control lookup, as discussed above with regard to FIG. 13, the software-based activity monitor may collect data from different on-chip and/or off-chip sources. Based on the collected data, a modification to throttling criteria may be determined. Various different power management scenarios, which may be determined from the collected data, can be accounted for or prevented by a change to throttling criteria.

As indicated at 2020, the software-based activity monitor may perform a single write to modify a remapping sub-table of a multi-level action table for the hardware-based activity monitor, in some embodiments. For example, the single write may be a write to a CSR that stores the remapping sub-table. In various embodiments, as discussed above with regard to FIGS. 8, 11, and 19, the multi-level action table may include different sub-tables that are accessed to determine throttling criteria used by the hardware-based activity monitor to evaluate activity of a third portion of an integrated circuit and to modify, according to the evaluation, a rate at which data enters the third portion of the integrated circuit, in some embodiments. For example, the third portion of the integrated circuit may be a processing engine, such as a systolic array, general purpose processor, graphics processor, or other processor. As discussed above with regard to FIG. 6, a throttler may, for instance, be used to stall data according to a throttling percentage to insert pipeline bubbles.

Figure 21:
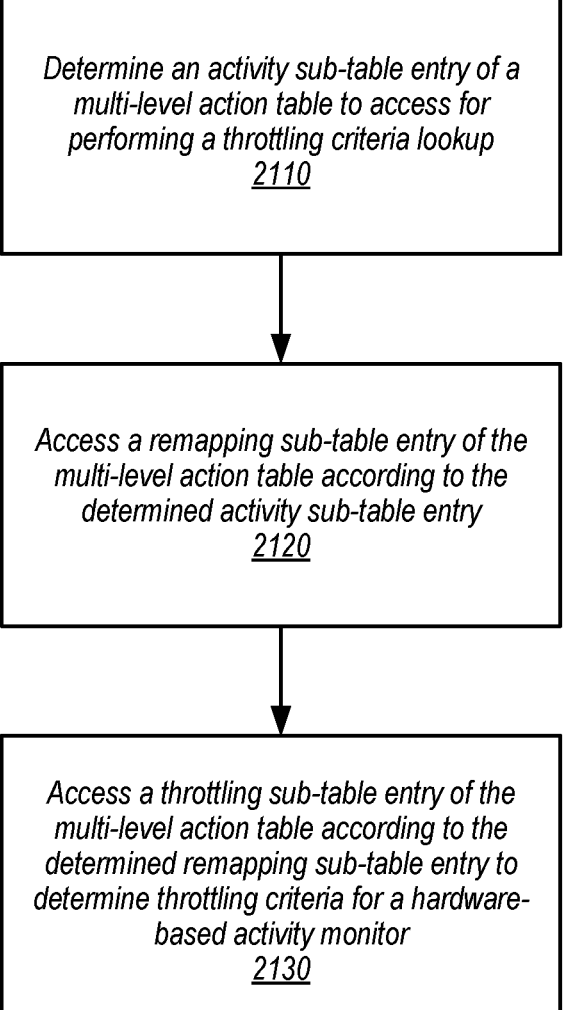
FIG. 21 is a high-level flowchart illustrating performing a lookup at a multi-level action table for throttling criteria at a hardware-based activity monitor, according to some embodiments.

FIG. 21 is a high-level flowchart illustrating performing a lookup at a multi-level action table for throttling criteria at a hardware-based activity monitor, according to some embodiments. As indicated at 2110, an activity sub-table entry of a multi-level action table to access for performing a throttling criteria lookup may be determined, in some embodiments. For instance, a hardware-based activity monitor may have a CSR which specifies the HYSTERESIS HIGH and HYSTERESIS LOW fields and a HYSTERESIS state bit which indicates when hysteresis is active and which selects which portion of the Action Sub-Table will be used for the Action Sub-Table lookup (e.g., where the HYSTERESIS bit replaces the rising/falling designation). At the end of each measurement period, if the HYSTERESIS bit is currently 0 and the current average activity is greater than or equal to the HYSTERESIS HIGH field, then the HYSTERESIS bit gets set to 1 and the Action Table lookup will be in the hysteresis portion of the Action Sub-Table; otherwise, the HYSTERESIS bit remains 0 and the Action Table lookup will be in the "no hysteresis" portion of the Action Sub-Table.

As indicated at 2120, a remapping sub-table entry of the multi-level action table according to the determined activity sub-table entry, in some embodiments. As noted above, the remapping sub-table may be used to switch between different throttling criteria. As discussed above with regard to FIGS. 19 and 20, the remapping sub-table may be written in a single write as part of dynamic remapping. The output of the remapping sub-table entry may then be used to access a throttling sub-table entry of the multi-level action table according to the determined remapping sub-table entry to determine throttling criteria for a hardware-based activity monitor, in some embodiments, as indicated at 2130.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Embodiments of a host system which may include or interact with a device that implements an integrated circuit that performs processing, such as the machine learning accelerator with a systolic array discussed above, may be implemented as part of a computer system. One such computer system is illustrated by FIG. 22. In different embodiments, computer system 3000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 3000 includes one or more processors 3010 coupled to a system memory 3020 via an input/output (I/O) interface 3030. Computer system 3000 may include one or more machine learning accelerators 3090 or other systolic arrays (e.g., similar to processing units and machine learning accelerators discussed above with regard to FIGS. 1-7). These machine learning accelerators 3090 or other systolic arrays may perform operations for various applications, which may include executing neural networks according to instructions generated by neural network compiler 3025 (or another compiler not illustrated), in some embodiments.

Computer system 3000 further includes a network interface 3040 coupled to I/O interface 3030, and one or more input/output devices 3050, such as cursor control device 3060, keyboard 3070, and display(s) 3080. Display(s) 3080 may include standard computer monitor(s) and/or other display systems, technologies or devices. In at least some implementations, the input/output devices 3050 may also include a touch- or multi-touch enabled device such as a pad or tablet via which a user enters input via a stylus-type device and/or one or more digits. In some embodiments, it is contemplated that embodiments may be implemented using a single instance of computer system 3000, while in other embodiments multiple such systems, or multiple nodes making up computer system 3000, may host different portions or instances of embodiments. For example, in one embodiment some elements may be implemented via one or more nodes of computer system 3000 that are distinct from those nodes implementing other elements.

In various embodiments, computer system 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

In some embodiments, at least one processor 3010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 3020 may store program instructions and/or data accessible by processor 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 3020 as program instructions, such as program instructions to implement neural network compiler 3025 and data storage 3035, respectively. In other embodiments, program instructions and/or data may be received, sent or stored upon different types of computer-accessible media or on similar media separate from system memory 3020 or computer system 3000. Generally speaking, a non-transitory, computer-readable storage medium may include storage media or memory media such as magnetic or optical media, e.g., disk or CD/DVD-ROM coupled to computer system 3000 via I/O interface 3030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 3040.

In one embodiment, I/O interface 3030 may coordinate I/O traffic between processor 3010, system memory 3020, and any peripheral devices in the device, including network interface 3040 or other peripheral interfaces, such as input/output devices 3050. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In addition, in some embodiments some or all of the functionality of I/O interface 3030, such as an interface to system memory 3020, may be incorporated directly into processor 3010.

Network interface 3040 may allow data to be exchanged between computer system 3000 and other devices attached to a network, such as other computer systems, or between nodes of computer system 3000. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3050 may, in some embodiments, include one or more display terminals, keyboards, keypads, touchpads, scanning devices, voice or optical recognition devices, or any other devices suitable for entering or retrieving data by one or more computer system 3000. Multiple input/output devices 3050 may be present in computer system 3000 or may be distributed on various nodes of computer system 3000. In some embodiments, similar input/output devices may be separate from computer system 3000 and may interact with one or more nodes of computer system 3000 through a wired or wireless connection, such as over network interface 3040.

Those skilled in the art will appreciate that computer system 3000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 3000 may be transmitted to computer system 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor;

a memory, storing program instructions that when executed by the at least one processor cause the at least one processor to submit one or more machine learning tasks for processing to an inference accelerator; and wherein the inference accelerator comprises an integrated circuit, wherein the integrated circuit comprises a software-based activity monitor implemented by firmware executing on a first portion of the integrated circuit, wherein the integrated circuit further comprises a tensor processing unit that comprises a hardware-based activity monitor implemented on a second portion of the integrated circuit and a systolic array implemented on a third portion of the integrated circuit that is configured to perform the one or more machine learning tasks; and wherein the software-based activity monitor is configured to:

determine an update to throttling criteria to be applied by the hardware-based activity monitor; and while the hardware-based activity monitor is monitoring activity of the systolic array:

perform a write to modify a remapping sub-table of a multi-level action table for the hardware-based activity monitor to point to a different entry in a throttling sub-table of the multiple level action table, wherein different sub-tables of the multi-level action table, including the remapping sub-table, are accessed to determine the throttling criteria used by the hardware-based activity monitor to evaluate activity of the systolic array and to modify, according to the evaluation, a rate at which data enters the systolic array for processing.

2. The system of claim 1, wherein as part of evaluating the activity of the systolic array, the hardware-based activity monitor is configured to:

determine an activity sub-table entry of the multilevel action table according to a measurement value for a measurement period;

access the remapping sub-table entry of the multi-level action table according to the determined activity sub-table entry; and access a throttling sub-table entry of the multi-level action table according to the determined remapping sub-table entry to determine a particular throttling criteria to consider.

3. The system of claim 2, wherein to determine the activity sub-table entry of the multilevel action table according to the measurement value for the measurement period, the hardware-based activity monitor is configured to compare the measurement value with a hysteresis high field to determine that a hysteresis bit, used to determine the activity sub-table entry, is set.

4. The system of claim 2, wherein to determine the activity sub-table entry of the multilevel action table according to the measurement value for the measurement period, the hardware-based activity monitor is configured to compare the measurement value with a hysteresis low field to determine that a hysteresis bit, used to determine the activity sub-table entry, is not set.

5. A method, comprising:

determining, by a software-based activity monitor implemented according to program instructions executing on a first portion of an integrated circuit, an update to throttling criteria to be applied by a hardware-based activity monitor implemented on a second portion of the integrated circuit; and while the hardware-based activity monitor is monitoring activity of a third portion of the integrated circuit:

performing, by the software-based activity monitor, a write to modify a remapping sub-table of a multi-level action table for the hardware-based activity monitor to point to a different entry in a throttling sub-table of the multiple level action table, wherein different sub-tables of the multi-level action table, including the remapping sub-table, are accessed to determine the throttling criteria used by the hardware-based activity monitor to evaluate activity of the third portion of the integrated circuit and to modify, according to the evaluation, a rate at which data enters the third portion of the integrated circuit for processing.

6. The method of claim 5, further comprising:

as part of evaluating the activity of the third portion of the integrated circuit:

determining, by the hardware-based activity monitor, an activity sub-table entry of the multilevel action table according to a measurement value for a measurement period;

accessing, by the hardware-based activity monitor, the remapping sub-table entry of the multi-level action table according to the determined activity sub-table entry; and accessing, by the hardware-based activity monitor, a throttling sub-table entry of the multi-level action table according to the determined remapping sub-table entry to determine a particular throttling criteria to consider.

7. The method of claim 6, wherein determining the activity sub-table entry of the multilevel action table according to the measurement value for the measurement period comprises comparing the measurement value with a hysteresis low field to determine that a hysteresis bit, used to determine the activity sub-table entry, is not set.

8. The method of claim 6, wherein determining the activity sub-table entry of the multilevel action table according to the measurement value for the measurement period comprises comparing the measurement value with a hysteresis high field to determine that a hysteresis bit value, used to determine the activity sub-table entry, is set.

9. The method of claim 5, further comprising:

determining, by the software-based activity monitor, a second update to second throttling criteria to be applied by a second hardware-based activity monitor implemented on a fourth portion of the integrated circuit; and while the second hardware-based activity monitor is monitoring activity of a fifth portion of the integrated circuit:

performing, by the software-based activity monitor, a write to modify a second remapping sub-table of a second multi-level action table for the second hardware-based activity monitor;

wherein the update to the second throttling criteria causes the second throttling criteria to be different than the updated throttling criteria.

10. The method of claim 5, wherein the processing performed on the second portion of the integrated circuit is performed on a systolic array.

11. The method of claim 10, wherein the multi-level action table is implemented as part of an array utilization monitor in the hardware-based activity monitor.

12. The method of claim 10, wherein the multi-level action table is implemented as part of an array data activity monitor in the hardware-based activity monitor.

13. A device, comprising circuitry that implements an integrated circuit, the integrated circuit comprising:

a first portion that implements a processing engine;

a second portion that implements a hardware-based activity monitor;

a third portion executing programing instructions that implement a software-based activity monitor, the software-based activity monitor configured to:

determine an update to throttling criteria to be applied by the hardware-based activity monitor; and while the hardware-based activity monitor is monitoring activity of the processing engine:

perform a write to modify a remapping sub-table of a multi-level action table for the hardware-based activity monitor to point to a different entry in the a throttling sub-table of the multiple level action table, wherein different sub-tables of the multi-level action table, including the remapping sub-table, are accessed to determine the throttling criteria used by the hardware-based activity monitor to evaluate activity of the processing engine and to modify, according to the evaluation, a rate at which data enters the processing engine for processing.

14. The device of claim 13, wherein as part of evaluating the activity of the first portion of the integrated circuit, the hardware-based activity monitor is configured to:

determine an activity sub-table entry of the multilevel action table according to a measurement value for a measurement period;

access the remapping sub-table entry of the multi-level action table according to the determined activity sub-table entry; and access a throttling sub-table entry of the multi-level action table according to the determined remapping sub-table entry to determine a particular throttling criteria to consider.

15. The device of claim 14, wherein to determine the activity sub-table entry of the multilevel action table according to the measurement value for the measurement period, the hardware-based activity monitor is configured to compare the measurement value with a hysteresis low field to determine that a hysteresis bit, used to determine the activity sub-table entry, is not set.

16. The device of claim 14, wherein to determine the activity sub-table entry of the multilevel action table according to the measurement value for the measurement period, the hardware-based activity monitor is configured to compare the measurement value with a hysteresis high field to determine that a hysteresis bit, used to determine the activity sub-table entry, is set.

17. The device of claim 14, wherein the software-based activity monitor is further configured to:

determine a second update to second throttling criteria to be applied by a different component of the hardware-based activity monitor; and while the hardware-based activity monitor is monitoring activity of the processing engine, perform a write to modify a second remapping sub-table of the multi-level action table for the hardware-based activity monitor.

18. The device of claim 13, wherein the processing engine is a systolic array and wherein the multi-level action table is implemented as part of an array utilization monitor in the hardware-based activity monitor.

19. The device of claim 13, wherein the processing engine is a systolic array and wherein the multi-level action table is implemented as part of an array data activity monitor in the hardware-based activity monitor.

20. The device of claim 14, wherein the integrated circuit is an application specific integrated circuit (ASIC), field programmable gate array (FPGA), or system-on-a-chip (SoC).

* * * * *